United States Patent
Choi et al.

(10) Patent No.: US 8,953,536 B2
(45) Date of Patent: Feb. 10, 2015

(54) METHOD AND A USER EQUIPMENT FOR TRANSMITTING A SIGNAL, AND A METHOD AND A BASE STATION FOR RECEIVING A SIGNAL

(75) Inventors: Jin Soo Choi, Anyang-si (KR); Han Gyu Cho, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 13/515,457

(22) PCT Filed: Dec. 17, 2010

(86) PCT No.: PCT/KR2010/009081
§ 371 (c)(1),
(2), (4) Date: Jun. 12, 2012

(87) PCT Pub. No.: WO2011/078525
PCT Pub. Date: Jun. 30, 2011

(65) Prior Publication Data
US 2012/0294247 A1    Nov. 22, 2012

Related U.S. Application Data

(60) Provisional application No. 61/289,367, filed on Dec. 22, 2009.

(30) Foreign Application Priority Data

Nov. 19, 2010  (KR) ........................ 10-2010-0115497

(51) Int. Cl.
*H04W 72/04*    (2009.01)
*H04W 88/00*    (2009.01)
(Continued)

(52) U.S. Cl.
CPC ............ *H04L 5/0044* (2013.01); *H04L 5/0069* (2013.01); *H04L 27/2636* (2013.01); *H04L 5/0023* (2013.01); *H04L 27/265* (2013.01)
USPC ......................................................... 370/329

(58) Field of Classification Search
None
See application file for complete search history.

(56) References Cited

U.S. PATENT DOCUMENTS

2006/0009224 A1*  1/2006  Lim et al. .................. 455/442
2008/0039107 A1*  2/2008  Ma et al. .................... 455/450
(Continued)

FOREIGN PATENT DOCUMENTS

KR    10-2009-0094736 A    9/2009

OTHER PUBLICATIONS

Fwu, Jong-Kae et al., "Proposed Text of UL Physical Layer Section for the IEEE 802.16m Amendment", Nov. 3, 2008, IEEE C802.16m-08/1444, 1-10.*

(Continued)

*Primary Examiner* — Steve Young
(74) *Attorney, Agent, or Firm* — Birch, Stewart, Kolasch & Birch, LLP

(57) ABSTRACT

A method for transmitting or receiving an uplink signal is disclosed. If a user equipment is connected to a base station in accordance with a legacy system support mode, it performs permutation for an uplink signal on a frequency axis in accordance with a first rule. If the user equipment is connected to the base station in accordance with a legacy system non-support mode, it performs permutation for the uplink signal on the frequency axis in accordance with a second rule. Cell ID corresponding to a secondary advanced preamble (SA-preamble) received from the base station is used for permutation based on the first rule and/or the second rule.

6 Claims, 11 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 2009/0262696 A1* | 10/2009 | Wei et al. | 370/329 |
| 2009/0262848 A1 | 10/2009 | Choi et al. | |
| 2010/0061333 A1* | 3/2010 | Marsh et al. | 370/330 |
| 2010/0069073 A1* | 3/2010 | Chen et al. | 455/437 |
| 2011/0002320 A1 | 1/2011 | Yuk et al. | |

OTHER PUBLICATIONS

Cho et al., "Evaluation and Proposed Text on UL Tile Permutation," IEEE 802.16 Broadband Wireless Access Working Group, IEEE C80216m-09_0628r3, Mar. 10, 2009, 26 pages.

Dongguk et al., "H-FDD Frame Structures for the AAIF and Legacy SUpports," IEEE 802.16 Broadband Wireless Access Working Group <http://ieee802.org/16>, IEEE C802.16m-09/1477, Jul. 6, 2009, pp. 1-9.

* cited by examiner (a) FDM (b) TDM

METHOD AND A USER EQUIPMENT FOR TRANSMITTING A SIGNAL, AND A METHOD AND A BASE STATION FOR RECEIVING A SIGNAL

This application is the National Phase of PCT/KR2010/009081 filed on Dec. 17, 2010, which claims priority under 35 U.S.C. 119(e) to U.S. Provisional Application No. 61/289,367 filed on Dec. 22, 2009, and under U.S.C. 119(a) to Patent Application No. 10-2010-0115497 filed in the Republic of Korea on Nov. 19, 2010, all of which are hereby expressly incorporated by reference into the present application.

TECHNICAL FIELD

The present invention relates to a wireless communication system, and more particularly, to a method and apparatus for transmitting or receiving a signal in a wireless communication system.

BACKGROUND ART

Referring to FIG. 1, a wireless communication system 100 includes a plurality of Base Stations (BSs) 110a, 110b and 110c and a plurality of User Equipments (UEs) 120a to 120i. The wireless communication system 100 may include homogeneous networks or heterogeneous networks. Heterogeneous networks refer to networks in which different network entities coexist, such as a WiFi, IEEE 802.16, LTE, etc. A BS is usually a fixed station that communicates with UEs. Each BS 110a, 110b or 110c provides services to its specific geographical area 102a, 102b or 102c. For the purpose of improving system performance, the specific service area of the BS may further be divided into a plurality of smaller areas 104a, 104b and 104c. These smaller areas may be called cells, sectors or segments. In an Institute of Electrical and Electronics Engineers (IEEE) 802.16 system, cell Identities (IDs) (Cell_IDs or IDCells) are assigned from the perspective of a whole system, whereas sector IDs or segment IDs are assigned from the perspective of the service coverage of each BS, ranging from 0 to 2. The UEs 120a to 120i, which are mobile or fixed, are generally distributed over the wireless communication system 100. Each UE may communicate with at least one BS on a downlink and an uplink at a point of time. The communication may be conducted in Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA), or a combination of them. Herein, a downlink refers to a communication link directed from a BS to a UE and an uplink refers to a communication link directed from the UE to the BS.

In the mean time, various standardization projects for construction of a wireless communication system have been progressed, and the improved standard developed from the existing standard is being settled. Generally, systems based on the improved standard are required to provide backward compatibility with a user equipment and a base station, which are implemented based on the previous standard. Accordingly, a method for providing backward compatibility from an improved system to an existing user equipment or an existing base station will be required.

DISCLOSURE OF INVENTION

Technical Problem

Accordingly, the present invention is directed to a method and apparatus for transmitting a signal in a wireless communication system that substantially obviates one or more problems due to limitations and disadvantages of the related art.

An object of the present invention is to provide a method for efficiently transmitting signals of different systems and an apparatus for the method.

Another object of the present invention is to provide a permutation method for increasing frequency diversity gain in transmitting signals of different systems and an apparatus for the same.

It is to be understood that technical objects to be achieved by the present invention are not limited to the aforementioned technical objects and other technical objects which are not mentioned will be apparent from the following description to the person with an ordinary skill in the art to which the present invention pertains.

Solution to Problem

To achieve the aforementioned technical objects, the present invention discloses a method for applying a permutation method in various manners depending on types of signals multiplexed in a frequency domain and an apparatus for the method.

Also, the present invention discloses a method for reducing transport overhead related to permutation information and an apparatus for the same.

In one aspect of the present invention, a method for transmitting a signal from a user equipment in a wireless communication system, which supports a legacy system and an enhanced system improved from the legacy system by adding one or more functions to the legacy system, comprises the steps of if the user equipment is an enhanced user equipment based on the enhanced system, performing permutation for an uplink (UL) signal on a frequency axis in accordance with a first rule when the enhanced user equipment is connected to a base station with a legacy system support mode, and performing permutation for the UL signal on the frequency axis in accordance with a second rule when the enhanced user equipment is connected to the base station with a legacy system non-support mode; and transmitting the UL signal to the base station, wherein the enhanced user equipment performs permutation for the UL signal by using the first rule or the second rule based on a cell identity (ID) corresponding to a secondary advanced (SA) preamble received from the base station.

In another aspect of the present invention, a user equipment for transmitting a signal in a wireless communication system, which supports a legacy system and an enhanced system improved from the legacy system by adding one or more functions to the legacy system, comprises if the user equipment is an enhanced user equipment based on the enhanced system, a receiver configured to receive an SA-preamble from a base station; a transmitter configured to transmit a UL signal to the base station; and a processor performing permutation for the UL signal on a frequency axis in accordance with a first rule when the enhanced user equipment is connected to the base station with a legacy system support mode, and performing permutation for the UL signal on the frequency axis in accordance with a second rule when the enhanced user equipment is connected to the base station with a legacy system non-support mode; wherein the processor performs permutation for the UL signal by using the first rule or the second rule based on a cell ID corresponding to the SA-preamble.

In still another aspect of the present invention, a method for receiving a signal from a user equipment to a base station in a wireless communication system, which supports a legacy system and an enhanced system improved from the legacy system by adding one or more functions to the legacy system, comprises the steps of if the base station is operated in accordance with a legacy system support mode, transmitting a cell ID of the base station to a legacy user equipment as a UL permbase (UL_PermBase), and transmitting an SA-preamble corresponding to the cell ID to an enhanced user equipment; and respectively receiving a UL signal of the legacy user equipment and a UL signal of the enhanced user equipment from the legacy user equipment and the enhanced user equipment, the UL signals being permutated on a frequency axis in accordance with a first rule based on the cell ID, if the base station is operated in accordance with a legacy system non-support mode, transmitting the SA-preamble corresponding to the cell ID to the enhanced user equipment; and receiving a UL signal of the enhanced user equipment from the enhanced user equipment, the UL signal being permutated on a frequency axis in accordance with a second rule based on the cell ID.

In further still another aspect of the present invention, a base station for receiving a signal from a user equipment in a wireless communication system, which supports a legacy system and an enhanced system improved from the legacy system by adding one or more functions to the legacy system, comprises a transmitter configured to transmit a signal; a receiver configured to receive a signal; and a processor connected to the transmitter and the receiver, the processor configured to control the receiver and the processor, wherein if the base station is operated in accordance with a legacy system support mode: the processor is further configured to control the transmitter to transmit a cell ID of the base station to a legacy user equipment as UL (UL_PermBase), control the transmitter to transmit a secondary advanced preamble (SA-preamble) corresponding to the cell ID to an improved user equipment, and control the receiver to respectively receive a UL signal of the legacy user equipment and a UL signal of the enhanced user equipment from the legacy user equipment and the enhanced user equipment, the UL signals being permutated on a frequency axis in accordance with a first rule based on the cell ID; and if the base station is operated in accordance with a legacy system non-support mode: the processor controls the transmitter to transmit the SA-preamble corresponding to the cell ID to the enhanced user equipment, and controls the receiver to receive a UL signal of the enhanced user equipment from the enhanced user equipment, the UL signal being permutated on a frequency axis in accordance with a second rule based on the cell ID.

In the above aspects, the first rule is defined in accordance with an Equation 1 below:

$$\text{Tiles}(s,n) = N_{subchannels} \times n + (Pt[(s+n) \bmod N_{subchannels}] + UL\_PermBase) \bmod N_{subchannels}, \quad \text{Equation 1}$$

where Tiles(s,n) represents a physical tile index for the n-th tile located at the s-th subchannel, $N_{subchannels}$ represents the number of subchannels, and Pt represents a tile permutation pattern, and the second rule is defined in accordance with an Equation 2 below:

$$\text{Tiles}(s,n,t) = L_{DRU,FPi} \times n + \{\text{PermSeq}[(n+107*s+1213*t) \bmod L_{DRU,FPi}] + UL\_PermBase\} \bmod L_{DRU,FPi}, \quad \text{Equation 2}$$

where Tiles(s,n,t) represents a physical tile index of the n-th tile located at the s-th distributed LRU (DLRU) of the t-th subframe, $L_{DRU,FPi}$ represents the number of DRUs included in frequency partition i, and PermSeq( ) represents a permutation sequence of a length $L_{DRU,FPi}$, and the improved user equipment performs permutation for the uplink signal by setting UL_PermBase of the Equation 1 and the Equation 2 to the cell ID.

In the above aspects, if the user equipment is the legacy user equipment based on the legacy system, the legacy user equipment receives UL_PermBase from the base station and performs permutation for the uplink signal by setting UL_PermBase of the Equation 1 to the received UL_PermBase.

The aforementioned technical solutions are only a part of the embodiments of the present invention, and various modifications to which technical features of the present invention are applied could be understood by the person with ordinary skill in the art to which the present invention pertains, based on the following detailed description of the present invention.

Advantageous Effects of Invention

According to the embodiments of the present invention, the following effects can be obtained.

First of all, signals of different systems can efficiently be transmitted at the same time.

Second, if signals of different systems are transmitted at the same time, diversity gain can be increased.

Third, transport overhead can be reduced in a wireless communication system.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODE FOR THE INVENTION

Figure 1:
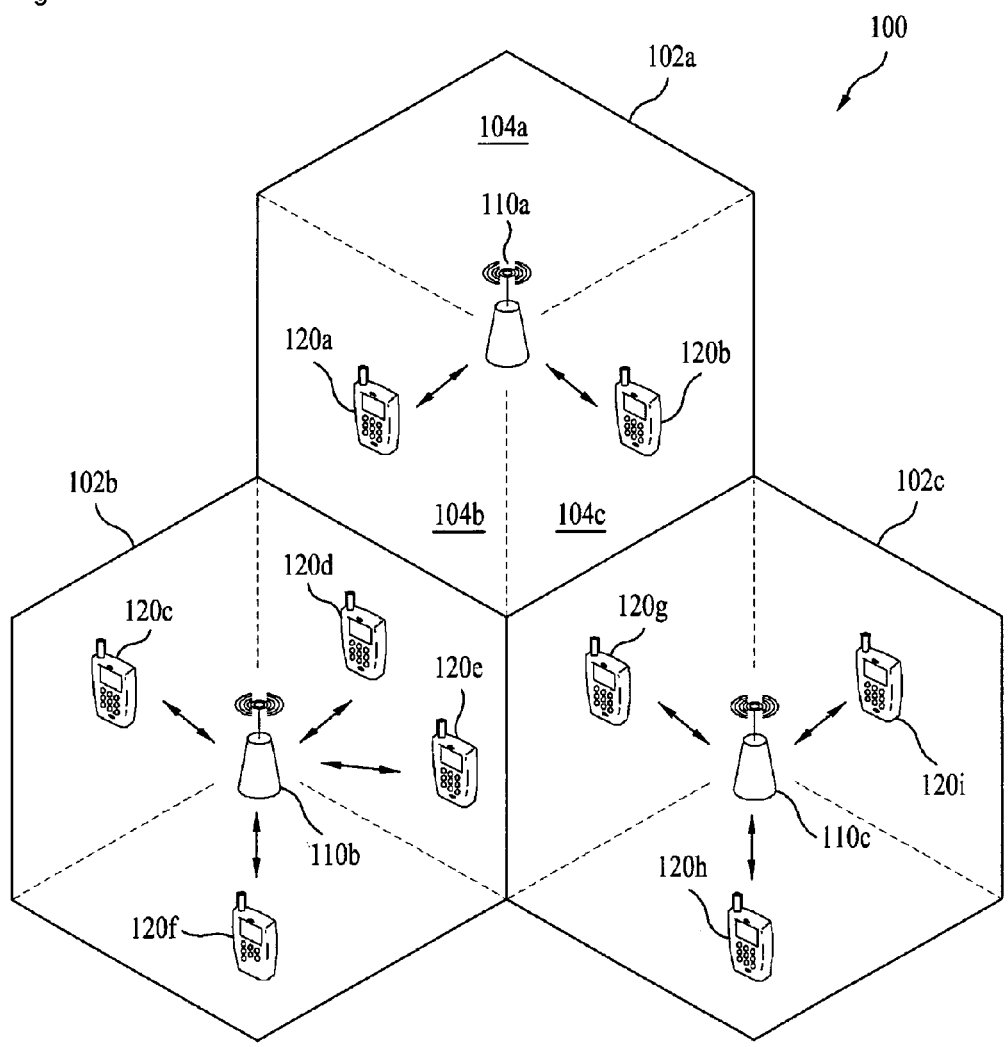
FIG. 1 is a diagram illustrating the configuration of an exemplary wireless communication system.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) denotes a mobile or fixed type user terminal. Examples of the terminal equipment include various equipments that transmit and receive user data and/or various kinds of control information to and from a base station. The terminal equipment may be referred to as a terminal equipment (TE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

Hereinafter, a system implemented in accordance with on the legacy standard will be referred to as a legacy system, and a system implemented in accordance with the standard improved from the legacy standard will be referred to as an improved system. Also, a user equipment and a base station implemented in accordance with the legacy standard will be referred to as a legacy user equipment and a legacy base station, respectively. And, a user equipment and a base station implemented in accordance with the improved standard will be referred to as an improved user equipment and an improved base station, respectively. For example, the IEEE 802.16e standard and the IEEE 802.16m standard are in the relation between the legacy standard and the improved standard, and the 3GPP LTE Release 8 standard (hereinafter, referred to as 3GPP LTE standard) and the 3GPP LTE Release 9~standard (hereinafter, referred to as 3GPP LTE-A standard) are in the relation between the legacy standard and the improved standard. Accordingly, the user equipment and the base station implemented in accordance with the IEEE 802.16e/3GPP LTE serve as the legacy base station for the user equipment and the base station implemented in accordance with the IEEE 802.16m/3GPP LTE-A. For another example, if new standard improved from the IEEE 802.16 and/or 3GPP LTE standard is defined, the current IEEE and 3GPP LTE standards serve as the legacy standards for the new standard.

Figure 2:
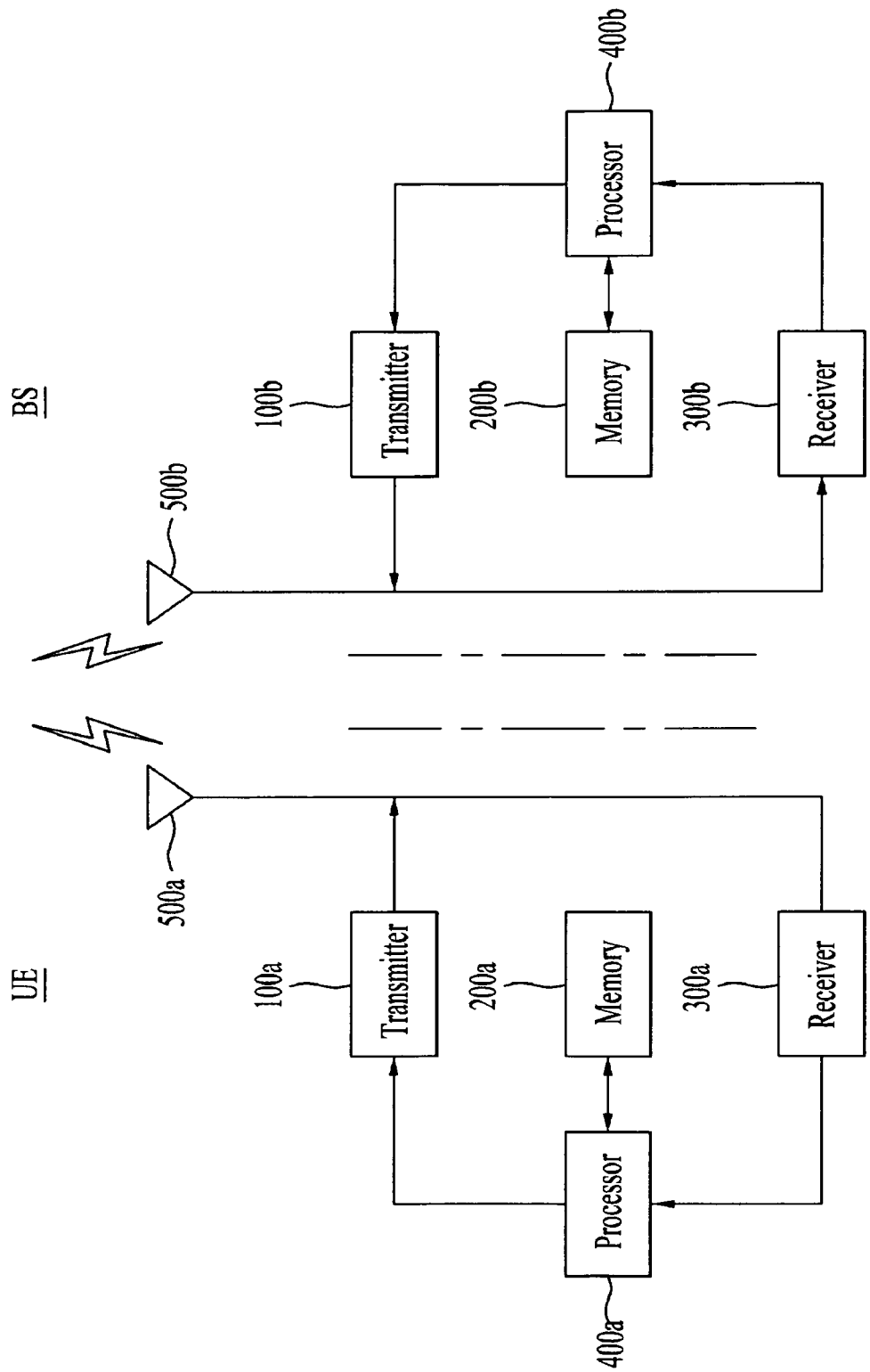
FIG. 2 is a block diagram illustrating a User Equipment (UE) and a Base Station (BS) for implementing the present invention.

FIG. 2 is a block diagram illustrating a user equipment and a base station for implementing the present invention.

The user equipment (UE) serves as a transmitting apparatus on the uplink and as a receiving apparatus on the downlink. By contrast, the base station (BS) may serve as a receiving apparatus on the uplink and as a transmitting apparatus on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components by separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a radio frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b can be referred as antenna ports. Each antenna port can correspond to one physical antenna or can be configured by a combination of more than one physical antenna. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be achieved by hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected with the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

Figure 3:
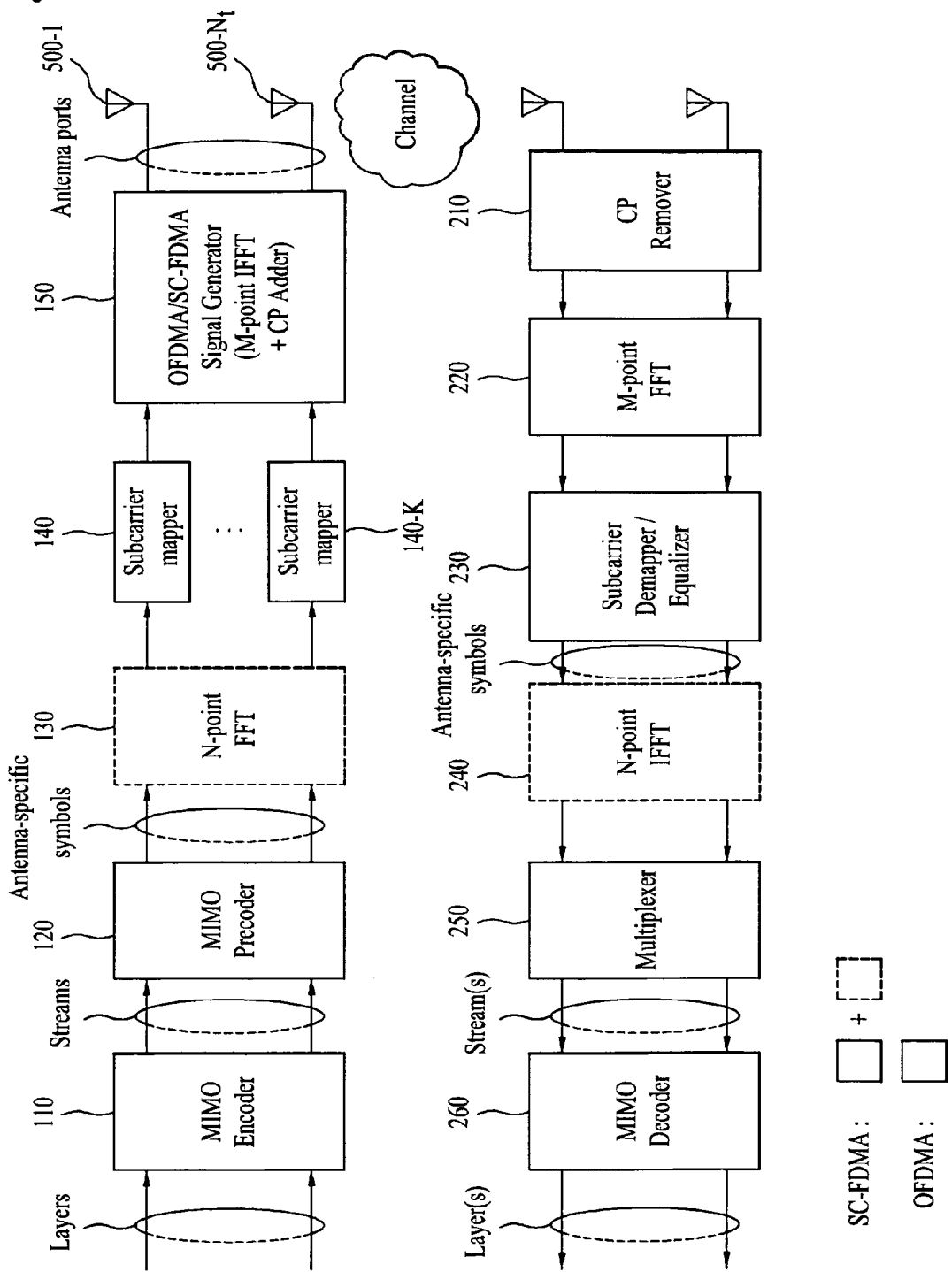
FIG. 3 is a block diagram illustrating an example of a transmitter in each of the UE and the BS.

FIG. 3 is a block diagram illustrating an example of a transmitter in each of the UE and the BS. Operations of the transmitters 100a and 100b will be described below in more detail with reference to FIG. 3.

Referring to FIG. 3, each of the OFDMA transmitters 100a and 100b includes a MIMO encoder 110, a MIMO precoder 120, subcarrier mappers 140-1 to 140-K, Orthogonal Frequency Division Multiplexing Access (OFDMA) signal generators. Each of the transmitter 100a and 100b is connected to $N_t$ transmission antennas 500-1 to 500-$N_t$.

The MIMO encoder 110 encodes a transmission data stream in accordance with a predetermined coding scheme to form coded data and modulates the coded data to be arranged as symbols representing positions on a signal constellation in a predetermined modulation scheme. The transmission data stream input to the MIMO encoder 110 may be generated by subjecting a data block received from a MAC layer to various signal processes such as channel encoding, interleaving, and scrambling. The data stream may be referred to as a codeword or a layer and is equivalent to a data block from the MAC layer. The data block from the MAC layer is referred to as a transport block. The modulation scheme may be, but not limited to, any of m-Phase Shift Keying (m-PKS) and m-Quadrature Amplitude Modulation (m-QAM). For modulating the coded data, the MIMO encoder 110 may have an independent modulation module. In the mean time, the MIMO encoder 110 may define MIMO streams of the input symbols such that the MIMO precoder 120 can distribute antenna-specific symbols to corresponding antenna paths. A MIMO stream refers to an information path input to the MIMO precoder 120, and the information path before the MIMO precoder 120 may be referred to as a virtual antenna or a MIMO stream. To define the MIMO streams of the symbols, the MIMO encoder 110 may be provided with a MIMO stream mapper configured as an independent module.

The MIMO precoder 120 outputs antenna-specific symbols to the subcarrier mappers 140-1 to 140-K by processing the received symbols in accordance with to a MIMO scheme according to the multiple transmission antennas 500-1 to 500-$N_t$. Mapping of the MIMO streams to the antennas 500-1 to 500-N, is performed by the MIMO precoder 120. Specifically, the MIMO precoder 120 multiplies the output x of the encoder 11 by an $N_r \times M_t$ precoding matrix W. The output of the MIMO precoder 120 may be represented as an $N_r \times N_F$ matrix $_z$.

The subcarrier mappers 140-1 to 140-K allocate the antenna-specific symbols to appropriate subcarriers and multiplex them according to user equipments. In the mean time, the subcarrier mappers 140-1 to 140-K may include LRU allocation block (not shown) for dividing the modulated symbols into LRU sized segments and allocating each segment to the LRU. The subcarrier mappers 140-1 to 140-K can include a mapping block (not shown) for mapping the LRU into burst data. The data burst is allocated to a PRU in a physical frequency domain. Accordingly, the subcarrier mappers 140-1 to 140-K serve to map the modulated data into subcarriers in accordance with a mapping relation between the LRU and the PRU.

The OFDMA signal generators 150 output OFDMA symbols by modulating the antenna-specific symbols according to OFDMA modulation scheme. For example, the OFDMA signal generators 150 may perform Inverse Fast Fourier Transform (IFFT) for the antenna-specific symbols and insert a Cyclic Prefix (CP) into the resulting IFFT time-domain symbol. After digital-to-analog conversion and frequency upconversion, the OFDMA symbol is transmitted to the receiving apparatus through the transmission antennas 500-1 to 500-$N_t$. The OFDMA signal generator 150 may include an IFFT module, a CP inserter, a Digital-to-Analog Converter (DAC), and a frequency upconverter.

The OFDMA receivers 300a and 300b process signals in reverse to the operation of the OFDMA transmitters.

More specifically, the receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include Nr reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module. More specifically, the signal recoverer may include an Analog-to-Digital Converter (ADC) for converting an analog signal to a digital signal, a CP remover 210 for removing a CP from the digital signal, a Fast Fourier Transform (FFT) module 220 for generating frequency symbols by applying FFT to the CP-removed signal, and a subcarrier demapper/equalizer 230 for recovering the frequency symbols to antenna-specific symbols. A multiplexer 250 recovers MIMO streams from the antenna-specific symbols and a MIMO decoder 260 recovers the data streams transmitted by the transmitting apparatus from the MIMO streams.

Compared to the OFDMA transmitter, an SC-FDMA transmitter further includes an FFT module 130 before the subcarrier mappers 140 to 140-K. The SC-FDMA transmitter may significantly reduce Peak-to-Average Power Ratio (PAPR) by spreading a plurality of data in the frequency domain through FFT before IFFT is performed, relative to the OFDMA scheme. An SC-FDMA receiver further includes an IFFT module 240 after the subcarrier demapper/equalizer 230 in addition to the components of the OFDMA receiver. The SC-FDMA receiver processes a signal in reverse to the operation of the SC-FDMA transmitter.

Although it has been described in FIG. 2 and FIG. 3 that each of the transmitters 110a and 100b includes the MIMO encoder 110, the MIMO precoder 120, the subcarrier mappers 140-1 to 140-K, and the OFDMA/SC-FDMA signal generators 150, the processors 400a and 400b of the transmitting apparatus may include the MIMO encoder 110, the MIMO precoder 120, the subcarrier mappers 140-1 to 140-K, and the OFDMA/SC-FDMA signal generators 150. Likewise, although it has been described in FIG. 2 and FIG. 3 that each of the receivers 300a and 300b includes the signal recoverer, the multiplexer, and the channel demodulator, the processors 400a and 400b of the receiving apparatus may include the signal recoverer, the multiplexer, and the channel demodulator. Hereinafter, for convenience of description, the MIMO encoder 110, the MIMO precoder 120, the subcarrier mappers 140-1 to 140-K, and the OFDMA/SC-FDMA signal generators 150 are included in the transmitters 100a and 100b separated from the processors 400a and 400b that control the operations of the MIMO encoder 110, the MIMO precoder 120, the subcarrier mappers 140-1 to 140-K, and the OFDMA/SC-FDMA signal generators 150. And, the signal recoverer, the multiplexer, and the channel demodulator are included in the receivers 300a and 300b separated from the processors 400a and 400b that control the operations of the signal recoverer, the multiplexer, and the channel demodulator. However, the embodiments of the present invention can equally be applied to the case where the MIMO encoder 110, the MIMO precoder 120, the subcarrier mappers 140-1 to 140-K, and the OFDMA/SC-FDMA signal generators 150 are included in the processors 400a and 400b and the case where the signal recoverer, the multiplexer, and the channel demodulator are included in the processors 400a and 400b.

The memories 200a and 200b may store programs required for signal processing and controlling of the processors 400a and 400b and temporarily store input and output information. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

In accordance with the improved system improved from the legacy system, the improved system is required to provide communication services to the user equipment implemented in accordance with the legacy system. In other words, it is preferable that the improved system satisfies backward compatibility to support communication services to the user equipment implemented in accordance with the legacy system as well as the user equipment implemented in accordance with new standard. One of the methods for supporting backward compatibility in the improved system is a method for multiplexing data for the legacy user equipment (hereinafter, referred to as legacy data) and data for the improved user equipment (hereinafter, referred to as improved data) by appropriately distributing radio resources to the legacy user equipment and the improved user equipment. In other words, the legacy data and the improved data are multiplexed within one superframe, frame, or subframe, and then transmitted, whereby backward compatibility can be supported.

Figure 4:
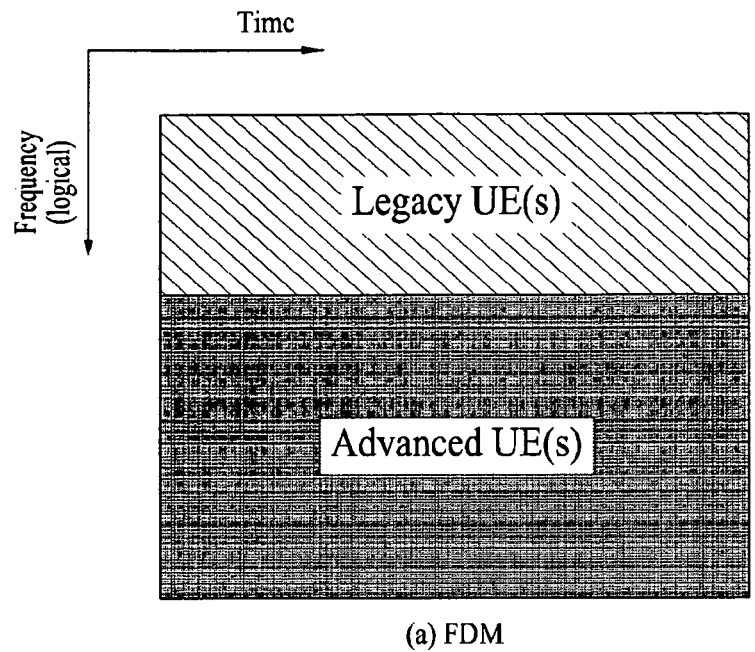
FIG. 4 is a conceptual view illustrating a method for multiplexing data of a legacy user equipment and data of an improved user equipment.
Figure 4:
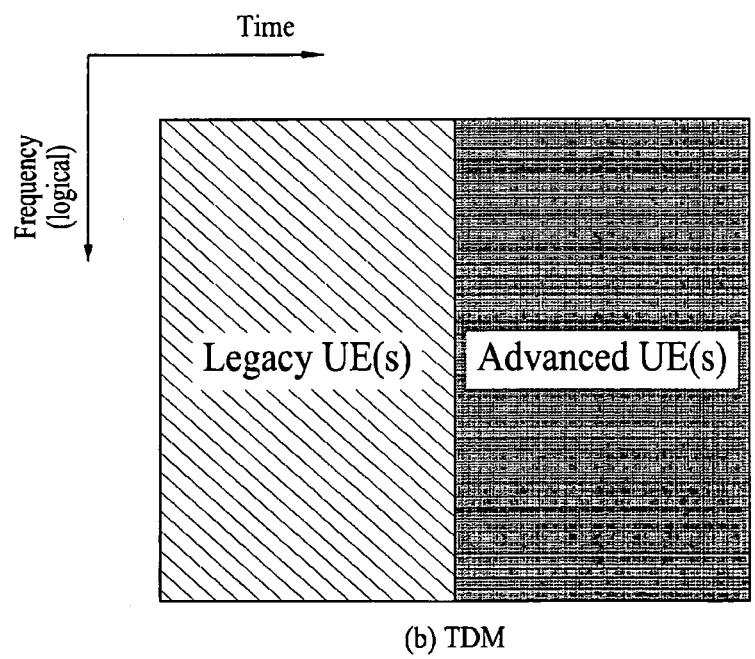

FIG. 4 is a conceptual view illustrating a method for multiplexing data of a legacy user equipment and data of an improved user equipment.

The legacy data and the improved data can be multiplexed in accordance with a frequency division multiplexing (FDM) manner and/or a time division multiplexing (TDM) manner.

Referring to FIG. 4(a), the FDM manner is to distribute available frequency resources to one or more legacy user equipments and one or more improved user equipments. In other words, according to the FDM manner, subcarriers for the legacy user equipment and subcarriers for the improved user equipment coexist in the same symbol.

Referring to FIG. 4(b), the TDM manner is to distribute available time resources to one or more legacy user equipments and one or more improved user equipments. In other words, according to the TDM manner, the same subcarrier may be used for the legacy user equipment or the improved user equipment as time varies.

The TDM manner is useful in that it supports full adaptability for optimizing the improved system. However, the TDM manner has a drawback in that it may cause link budget loss against the legacy system. In the mean time, the FDM manner has an advantage in that it can minimize a link budget effect on the legacy system.

Figure 5:
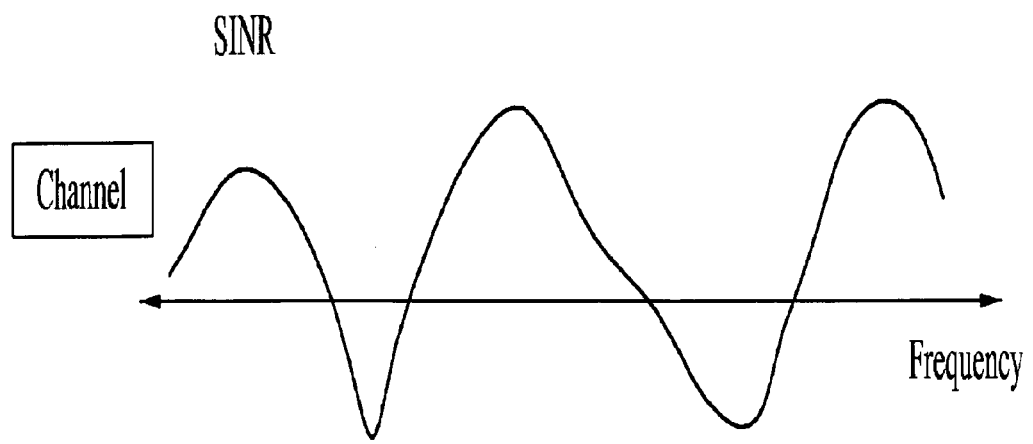
FIG. 5 illustrates an exemplary channel change in frequency in the wireless communication system.

FIG. 5 illustrates an exemplary channel change in frequency in the wireless communication system.

Referring to FIG. 5, if a system band has a bandwidth greater than a coherence bandwidth, a channel may fluctuate greatly in the system band. Then a frequency diversity gain may be achieved by spreading a transmission signal across all or part of the system band along the frequency axis. For example, allocation of frequency resources to the transmission signal by appropriate permutation may lead to mixing and spreading of the transmission signal across a predetermined bandwidth. Accordingly, there exists a continuous need for a permutation scheme to effectively distribute a transmission signal across a predetermined bandwidth.

Figure 6:
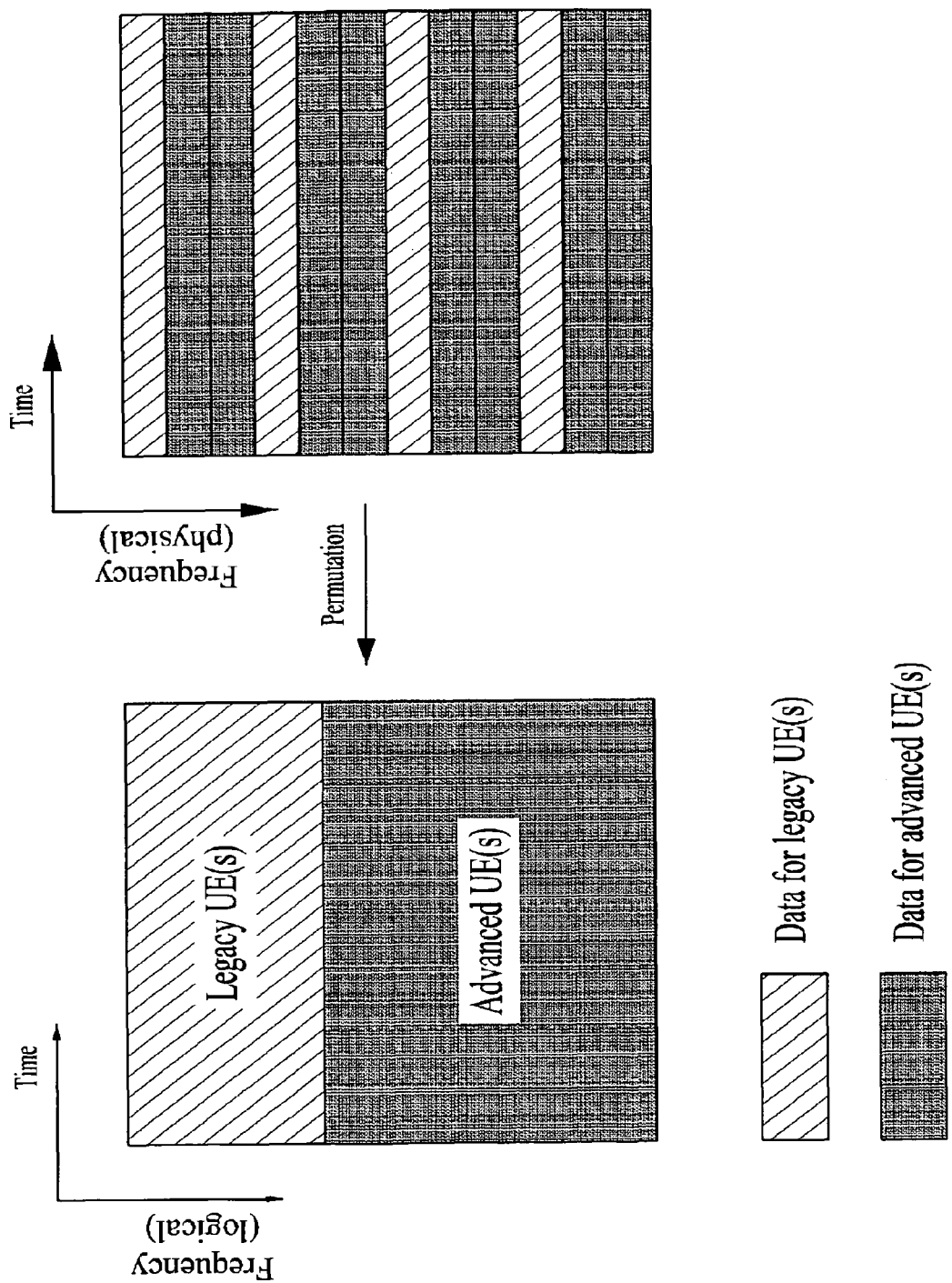
FIG. 6 is a conceptual view illustrating a mapping process of mapping physical frequency resources into logical frequency resources through permutation.

FIG. 6 is a conceptual view illustrating a mapping process of mapping physical frequency resources into logical frequency resources through permutation.

Permutation means a process of mapping predetermined physical resources into logical resources. In case of frequency permutation, transport signals are distributed on a frequency axis at a corresponding bandwidth as permutation is applied to frequency resources on the frequency axis. Accordingly, it can be prevented that all of the transport signals are damaged, even though the channel, status of a specific frequency is not good.

Generally, according to frequency permutation, physical frequency resources are mapped into logical frequency resources as a random sequence is generated using a specific seed. If the frequency resources are divided in the legacy system and the improved system in accordance with the same rule and the divided resource units are permutated in accordance with the same permutation rule, there, is no problem in multiplexing the legacy data and the improved data on the frequency axis. However, if there is any difference in resource allocation unit between the legacy system and the improved system, or if there is any difference in a permutation rule between them, an appropriate permutation rule will be required to support both the legacy user equipment and the improved user equipment in accordance with the FDM manner.

In case of a downlink, since one base station distributes frequency resources to one or more user equipments, it is easy to distribute frequency resources to different user equipments without overlap. However, in case of an uplink, frequency permutation is applied to the improved user equipment and the legacy user equipment independently. In order that the result of permutation performed by the improved user equipment does not collide with the result of permutation performed by the legacy user equipment, the improved user equipment and the legacy user equipment should use a unified permutation method. Hereinafter, a resource permutation method for uplink transmission will be described.

In the present invention, the base station can be operated in a legacy system support mode or a legacy system non-support mode. The legacy system non-support mode means that a signal for the improved user equipment is only transmitted in the downlink and/or the uplink. The legacy system support mode means that signals for the improved user equipment and the legacy user equipment are transmitted in the downlink and/or the uplink. The legacy system support mode can be classified into an FDM based legacy system support mode and a TDM based legacy system support mode depending on how legacy data and improved data are multiplexed.

If the base station supports the legacy system, the legacy user equipment within the coverage of the base station recognizes the base station as the legacy base station. The legacy user equipment cannot know whether the base station supports the legacy system or not, but even so it can be operated normally. Unlike this, the improved user equipment within the coverage of the base station uses variable frequency and/or time resources depending on whether the base station supports the legacy system or not. Accordingly, the improved user equipment performs a downlink receiving method and/or an uplink transmitting method differently depending on the mode connected with the base station.

Figure 7:
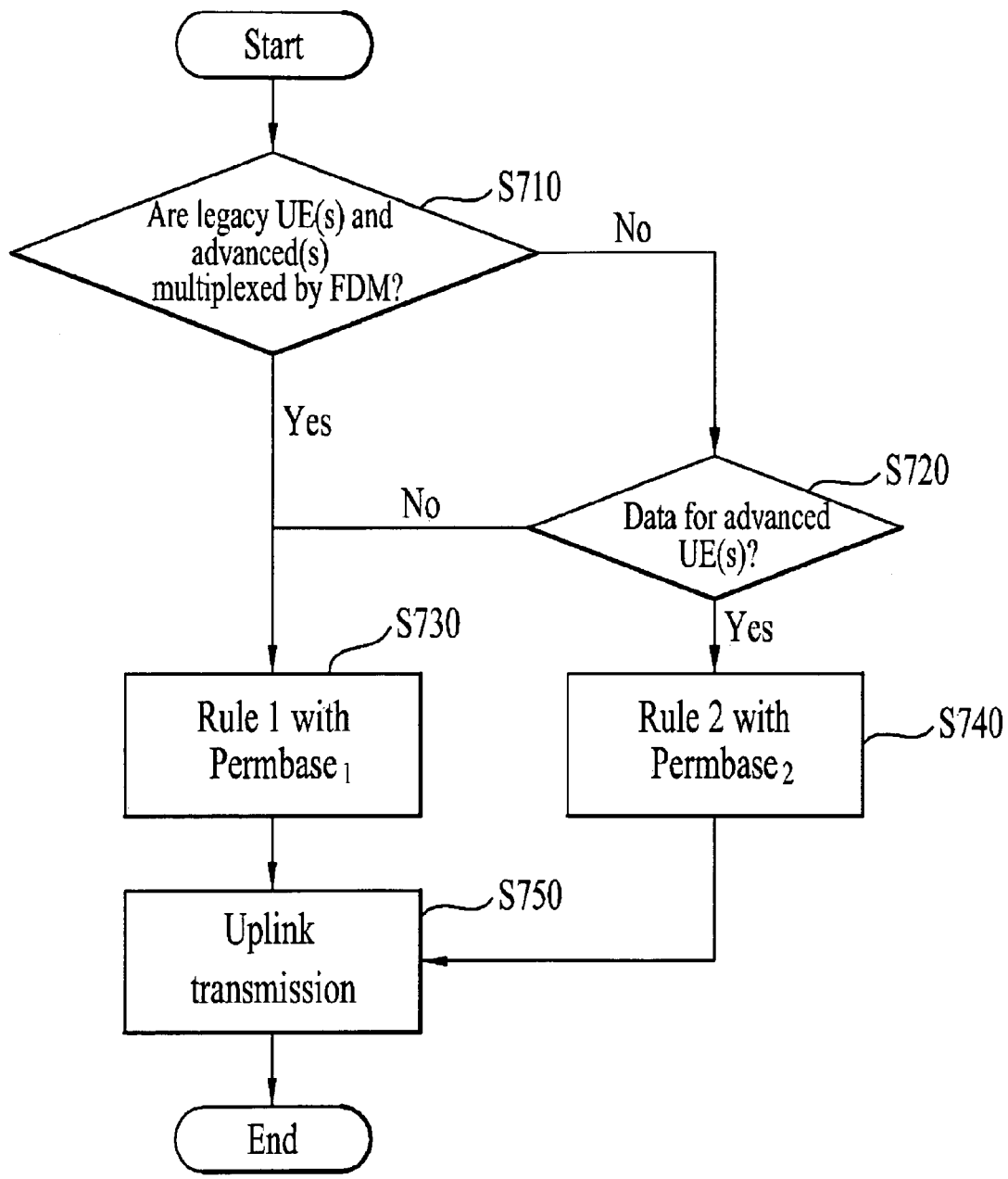
FIG. 7 is a flow chart illustrating a resource permutation method in an uplink according to the present invention.

FIG. 7 is a flow chart illustrating a resource permutation method in an uplink according to the present invention.

Referring to FIG. 7, if the base station is operated in accordance with the FDM based legacy system support mode (S710), the legacy user equipment within the coverage of the base station can use frequency resources of a predetermined time interval for uplink transmission (S720). The legacy user equipment performs resource permutation in accordance with rule 1 by using PermBase1 (S730), and performs uplink transmission through the frequency resources distributed by the permutation (S750). The rule 1 is a permutation rule defined in the legacy system. The PermBase1 is a value defined in the legacy system.

In the mean time, if the base station is operated in accordance with the FDM based legacy system support mode, the improved user equipment within the coverage of the base station is connected to the base station in accordance with the FDM based legacy system support mode. If the improved user equipment is connected to the base station with the FDM legacy system support mode (S710), the improved user equipment can perform uplink transmission for the predetermined time interval for which the legacy user equipment performs uplink transmission. The improved user equipment performs permutation in accordance with the rule 1 by using the same PermBase1 as that used by the legacy user equipment (S730). The improved user equipment can perform uplink transmission through the frequency resources distributed by the permutation within the predetermined time interval (S750). If different permutation rules or different PermBases are used within the predetermined time interval, same physical frequencies may be mapped into different logical frequencies. In this case, it is difficult for the base station to identify which user equipment uses a corresponding frequency for data transmission. Also, since mapping of same physical frequencies into a plurality of logical frequencies means collision of frequency resources used by several user equipments, a problem may occur in that it is difficult to reduce interference between uplink transmission signals. Accordingly, it is preferable that user equipments within one coverage of the base station performs permutation for frequency resources in accordance with the same permutation rule by using the same PermBase as suggested in the present invention.

On the other hand, if the improved user equipment is connected to the base station with the legacy system non-support mode (S710) and thus performs uplink transmission for a predetermined time interval (S720), it performs permutation in accordance with a rule 2 by using PermBase2 (S740). The rule 2 may be a rule newly defined in the improved system. The improved user equipment can perform uplink transmission through the frequency resources distributed by the permutation within the predetermined time interval (S750).

In the mean time, the PermBase1 and/or the PermBase2 may be values varied depending on the base station or cell. Since the PermBase1 and the PermBase2 are necessarily required for permutation, the improved user equipment connected to the base station in accordance with the FDM based legacy system support mode should know the PermBase1 and the PermBase2 explicitly or implicitly. If the PermBase1 and the PermBase2 are values different from each other, each of information indicating the PermBase 1 and information indicating the PermBase2 should be signaled to the improved user equipment explicitly or implicitly. On the other hand, if the PermBase1 and the PermBase2 are values the same as each other, the improved user equipment can perform permutation based on the rule 1 and permutation based on the rule 2 even though it receives either the information indicating the PermBase1 or the information indicating the PermBase2 from the base station. In other words, if the PermBase1 and the PermBase2 are values the same as each other, it is advantageous in that overhead in downlink transmission can be reduced. Accordingly, according to an embodiment suggested in the present invention, the PermBase1 and the PermBase2 used for permutation based on the rule 1 or the rule 2 are values the same as each other. For example, in the present invention, cell ID (also referred to as cell_ID or IDcell) can be used as the PermBase1 and the PermBase2.

If the cell ID is used as the PermBase1 and the PermBase2, it is preferable that cell IDs in the legacy system and cell IDs in the improved system are used together. For example, some of the cell IDs of the improved system may be assigned to the legacy system and some of the cell IDs may be assigned to the FDM based legacy system support mode. In other words, the cell IDs can be configured in such a manner that some of the cell IDs of the improved system are dedicated for the legacy system, another of the cell IDs are commonly used as the PermBase of the legacy system and the cell IDs of the improved system, and the others of the cell IDs are dedicated for the improved system.

Hereinafter, the mobile communication system according to the present invention, which is the IEEE 802.16 system, for example, will be described in more detail. However, except for specific details of the IEEE 802.16 system, the IEEE 802.16 system may be applied to other random mobile communication systems.

Figure 8:
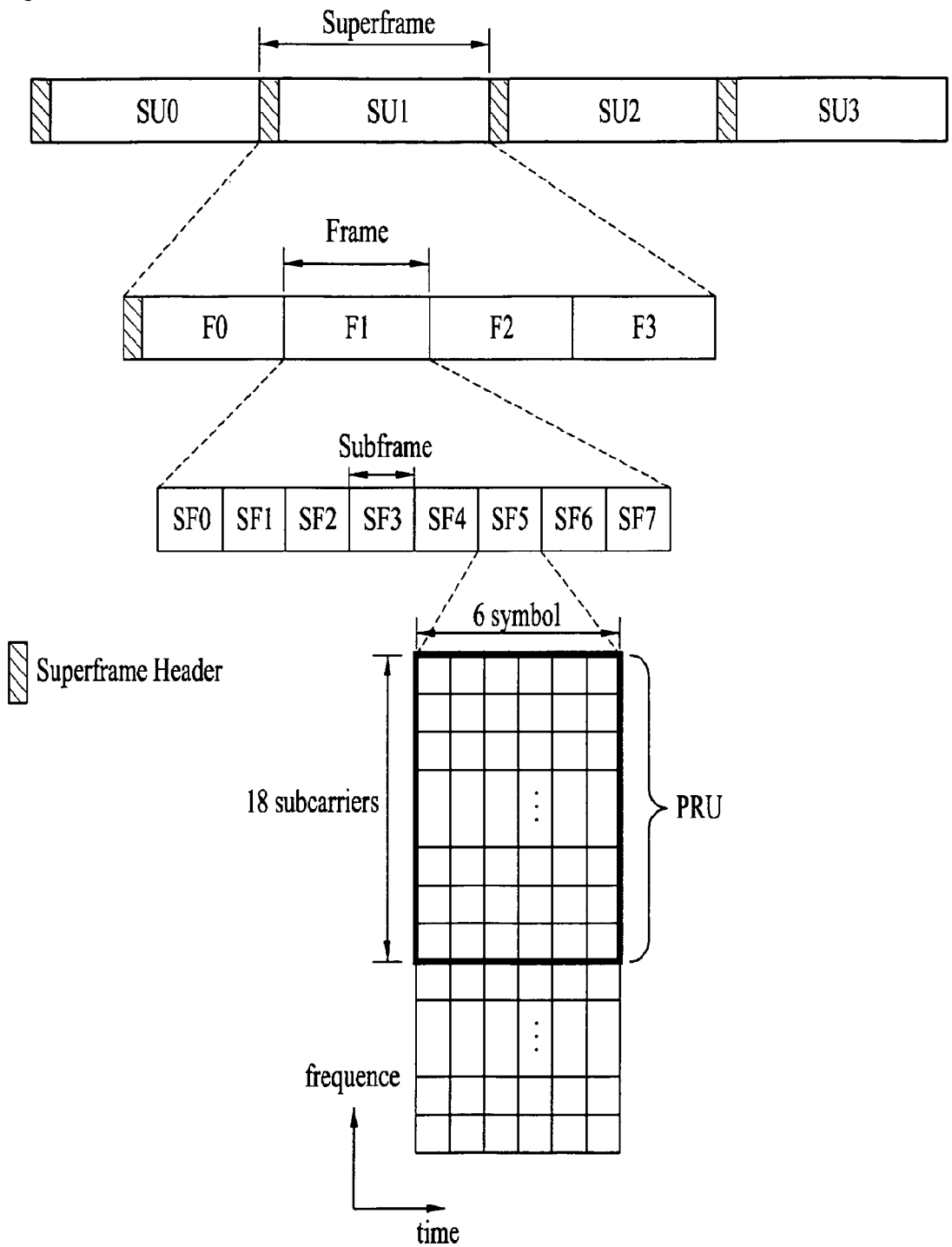
FIG. 8 illustrates a structure of a radio frame of the IEEE 802.16 system.

FIG. 8 illustrates a structure of a radio frame of the IEEE 802.16 system. The radio frame structure can be applied to a Frequency Division Duplex (FDD) mode, a Half Frequency Division Duplex (H-FDD) mode, and a Time Division Duplex (TDD) mode.

Referring to FIG. 8, the radio frame includes superframes SU0 to SU3 of 20 ms that support a bandwidth of 5 MHz, 8.75 MHz, 10 MHz or 20 MHz. Each superframe includes four frames F0 to F3 of 5 ms having the same size, and starts with a SuperFrame Header (SFH). The SFH carries essential system parameters and system configuration information. The SFH can be located within the first subframe of the superframe. The SFH can be classified into a Primary SFH (P-SFH) and a Secondary SFH (S-SFH). The P-SFH is transmitted per superframe. The S-SFH may be transmitted per superframe. The SFH can include a broadcast channel.

One frame can include eight subframes SF0 to SF7. The eight subframes within each from are numbered from 0 to 7. The frame can be configured differently depending on duplex modes. For example, since downlink transmission and uplink transmission are identified by frequency in the FDD mode, one frame includes either downlink subframes or uplink subframes. In the FDD mode, an idle time can exist at the end of each frame. On the other hand, since downlink transmission and uplink transmission are identified by time in the TDD mode, subframes within the frame are classified into a downlink subframe and an uplink subframe. In the TDD mode, an idle time referred to as a Transmit/receive Transition Gap (TTG) exists while the downlink is being changed to the uplink. Also, idle time referred to as a Receive/transmit Transition Gap (RTG) exists while the uplink is being changed to the downlink.

The subframe is a unit of a Transmission Time Interval (TTI). In other words, one TTI is defined by one or more subframes. In general, basic TTI is set to one subframe. The TTI means a time interval that a physical layer transmits coded packets through a radio interface. Accordingly, one subframe or a plurality of neighboring subframes can be used for transmission of data packets.

The subframe includes a plurality of OFDMA symbols in a time domain and a plurality of subcarriers in a frequency domain. The OFDMA symbols may be referred to as OFDMA symbols or SC-FDMA symbols depending on a multiplexing access mode. The number of OFDMA symbols included in one subframe can be varied depending on channel bandwidth and CP length. A type of the subframe can be defined depending on the number of OFDMA symbols included in the subframe. For example, the type of the subframe can be defined in such a manner that subframe type-1 includes six OFDMA symbols, subframe type-2 includes seven OFDMA symbols, subframe type-3 includes five OFDMA symbols, and subframe type-4 includes nine OFDMA symbols. One frame may include one type of subframes or different types of subframes. For convenience of description, the subframe type-1 that includes six OFDMA symbols is described in the embodiments of the present invention. However, the embodiments of the present invention, which will be described later, can be applied to the other types of subframes in the same manner.

In the frequency domain, the OFDMA symbol includes a plurality of subcarriers, and the number of subcarriers is determined depending on the size of FFT. The subcarriers can be classified into data subcarriers for data transmission, pilot subcarriers for channel measurement, and null subcarriers for guard band and DC components. Examples of parameters for the OFDMA symbols include BW, Nused, n, G, etc. The BW is a nominal channel bandwidth. Nused is the number of subcarriers used for signal transmission. Also, n is a sampling factor, and determines subcarrier spacing and useful symbol time together with BW and Nused. G is a ratio between CP time and useful time.

In the frequency domain, resources can be grouped in a predetermined number of subcarriers. A group comprised of a predetermined number of subcarriers within one subframe is referred to as a Physical Resource Unit (PRU). The subframe includes a plurality of PRUs in the frequency domain. The PRU is a basic unit for resource allocation, and includes a plurality of continuous OFDMA symbols in the time domain and a plurality of continuous subcarriers in the frequency domain. For example, the number of OFDMA symbols within the PRU may be the same as the number of OFDMA symbols included in the subframe. Accordingly, the number of OFDMA symbols within the PRU can be determined depending on the type of the subframe. In the mean time, the number of subcarriers within the PRU may be 18. In this case, the PRU includes 6 OFDMA symbols×18 subcarriers. The PRU can be denoted as a Distributed Resource Unit (DRU) or a Contiguous Resource Unit (CRU) depending on a resource allocation type. A basic permutation unit of a downlink DRU is a tone-pair that includes two subcarriers and one symbol. In case of the subframe type-1, one PRU includes 108 tones. A tone can be also referred to as a resource element.

The subframe can be divided into at least one Frequency Partition (FP) in the frequency domain. The FP can be used for Fractional Frequency Reuse (FFR). Each FP includes one or more PRUs. Distributed resource allocation and/or contiguous resource allocation can be applied to each FP. A Logical Resource Unit (LRU) is a basic logical unit for distributed resource allocation and contiguous resource allocation. A Logical Distributed Resource Unit (LDRU) includes a plurality of subcarriers (Sc) distributed within the frequency band. The LDRU has the same size as that of the PRU. The LDRU is also referred to as a distributed LRU (DLRU). A Logical Contiguous Resource Unit (LCRU) includes contiguous subcarriers (Sc). The LCRU has the same size as that of the PRU. The LCRU is also referred to as a contiguous LRU (CLRU).

The aforementioned structure is only exemplary. Accordingly, various modifications can be made in the length of the superframe, the number of subframes included in the superframe, the number of OFDMA symbols included in the subframe, and parameters of OFDMA symbols. For example, the number of subframes included in the frame can be varied depending on the channel bandwidth and the CP length.

In the mean time, a maximum of four synchronization signals may be transmitted in one superframe. For example, in the IEEE 802.16m system, a downlink synchronization signal includes a primary synchronization signal and a secondary synchronization signal, wherein the primary synchronization signal includes a PA-Preamble and the secondary synchronization signal includes an SA-Preamble. In the FDD mode and the TDD mode, each of the PA-Preamble, the SA-Preamble or a Location Based Service (LBS) location beacon is located at the first symbol of each frame. In more detail, the PA-Preamble is located at the first symbol of the second frame F1 within the superframe, and the SA-Preamble is located at the first symbol of the first and third frames F0 and F2 within the superframe. The first symbol of the last frame F3 within the superframe contains the LBS location beacon if the superframe is for location measurement for LBS, or the first symbol of the last frame F3 within the superframe contains a data signal. The PA-Preamble carries system bandwidth and carrier configuration information. Accordingly, the UE can obtain system bandwidth and carrier configuration information from the PA-Preamble.

The SA-Preamble carries the cell ID of the BS. The SA-Preamble is respectively transmitted on the first symbols within the first and third frames during one superframe. The UE may detect the cell ID of the corresponding BS or performs cell scanning during handover by using the SA-Preamble transmitted two times within one superframe.

Figure 9:
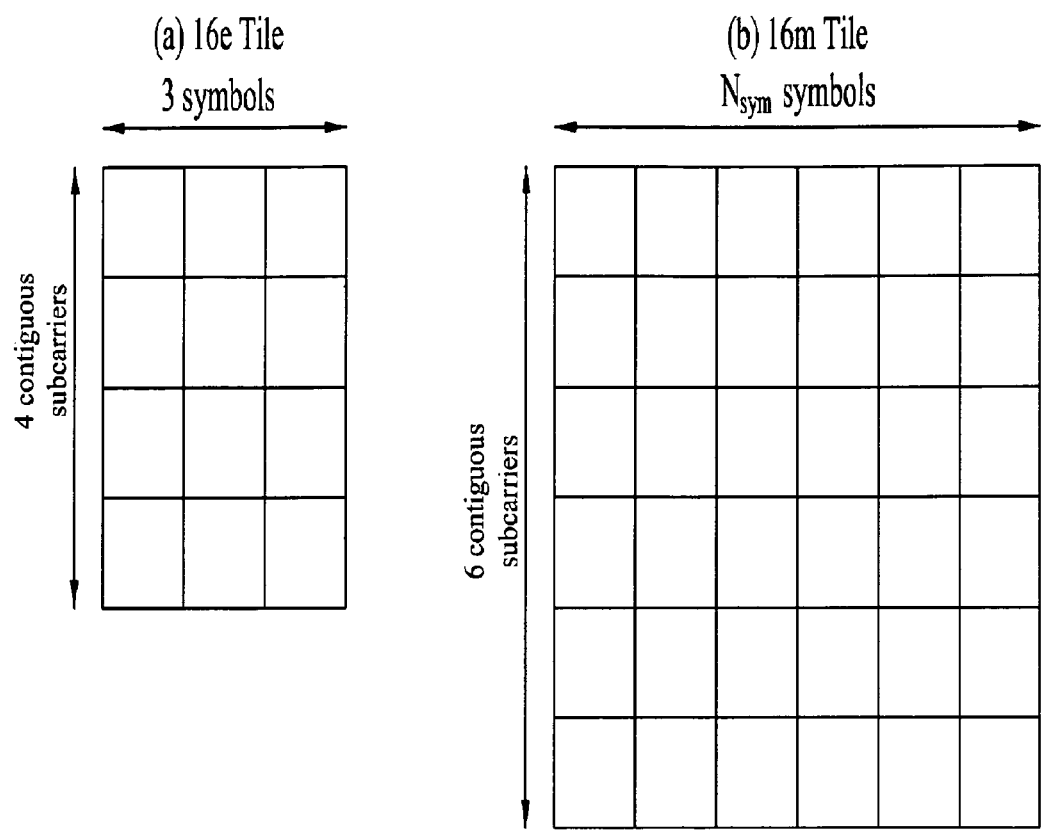
FIG. 9 illustrates an uplink tile structure based on the IEEE 802.16e system and an uplink tile structure based on the IEEE 802.16m system.

FIG. 9 illustrates an uplink tile structure based on the IEEE 802.16e system and an uplink tile structure based on the IEEE 802.16m system.

In the uplink of the IEEE 802.16e, one slot includes three OFDMA symbols and one subchannel. Each slot includes 48 data subcarriers and 24 pilots. One subchannel includes six uplink tiles. Referring to FIG. 9(a), each tile in the IEEE 802.16e includes four contiguous subcarriers.

Available subcarriers within a frequency band allocated to a specific user equipment are classified into $N_{tile}$ number of physical tiles. The $N_{tile}$ number of physical tiles are allocated to logical tiles within the subcarriers as follows. For example, the physical tiles can be allocated to the logical tiles in accordance with the following Math Figure.

MathFigure 1

$$\text{Tiles}(s,n) = N_{subchannels} \cdot n + (Pt[s+n] \bmod N_{subchannels}) + UL\_PermBase) \bmod N_{subchannels} \quad [\text{Math.1}]$$

The Math Figure 1 is also referred to as a permutation formula. In the Math Figure 1, Tiles(s,n) represents a physical index for the n-th tile in the s-th subchannel, $N_{subchannels}$ represents the number of subchannels, and Pt represents a tile permutation sequence or tile permutation pattern. s is a subchannel number and has one integer value between 0 and $N_{subchannels}-1$, and n is a tile index within one subchannel and has one integer value between 0 and 5. UL_PermBase is an integer value allocated by a management entity, for example, base station, and is transmitted to the user equipment through an uplink channel descriptor (UCD). The base station according to the present invention does not transmit a random value to the user equipment but transmits cell ID (IDcell) to which the user equipment belongs, to the user equipment for the UL_PermBase. In other words, the processor 400b of the base station according to the present invention generates a UCD that includes cell ID as UL_PermBase, and transmits the UCD to the legacy user equipment(s) belonging to the cell corresponding to the cell ID by controlling the base station transmitter 100b. As a result, in the same manner as the improved user equipment, which will be described later, the legacy user equipment according to the present invention performs tile permutation by using cell ID as UL_PermBase.

Table 1 to Table 4 respectively illustrate permutation parameters for 2048-point FFT, 1024-point FFT, 512-point FFT, and 128-point FFT.

TABLE 1

| Parameter | Value | Notes |
| --- | --- | --- |
| Number of DC subcarriers | 1 (Index 1024, counting from 0) | Index 1024 |
| $N_{used}$ | 1681 | Number of all subcarriers used within a symbol |
| Guard subcarriers: Left, Right | 184, 183 | |
| TilePermutation | 6, 48, 58, 57, 50, 1, 13, 26, 46, 44, 30, 3, 27, 53, 22, 18, 61, 7, 55, 36, 45, 37, 52, 15, 40, 2, 20, 4, 34, 31, 10, 5, 41, 9, 69, 63, 21, 11, 12, 19, 68, 56, 43, 23, 25, 39, 66, 42, 16, 47, 51, 8, 62, 14, 33, 24, 32, 17, 54, 29, 67, 49, 65, 35, 38, 59, 64, 28, 60, 0 | Used to allocate tiles to subchannels |
| $N_{subchannels}$ | 70 | |
| $N_{tiles}$ | 420 | |
| Number of subcarriers per tile | 4 | Number of all subcarriers used within tile |
| Tiles per subchannel | 6 | |

TABLE 2

| Parameter | Value | Notes |
| --- | --- | --- |
| Number of DC subcarriers | 1 | Index 512 |
| $N_{used}$ | 841 | Number of all subcarriers used within a symbol |
| Guard subcarriers: Left, Right | 92, 91 | |
| TilePermutation | 11, 19, 12, 32, 33, 9, 30, 7, 4, 2, 13, 8, 17, 23, 27, 5, 15, 34, 22, 14, 21, 1, 0, 24, 3, 26, 29, 31, 20, 25, 16, 10, 6, 28, 18 | Used to allocate tiles to subchannels |
| $N_{subchannels}$ | 35 | |
| $N_{tiles}$ | 210 | |
| Number of subcarriers per tile | 4 | Number of all subcarriers used within tile |
| Tiles per subchannel | 6 | |

TABLE 3

| Parameter | Value | Notes |
| --- | --- | --- |
| Number of DC subcarriers | 1 | Index 256 |
| $N_{used}$ | 409 | Number of all subcarriers used within a symbol |
| Guard subcarriers: Left, Right | 52, 51 | |
| TilePermutation | 11, 15, 10, 2, 12, 9, 8, 14, 16, 4, 0, 5, 13, 3, 6, 7, 1 | Used to allocate tiles to subchannels |
| $N_{subchannels}$ | 17 | |
| $N_{tiles}$ | 102 | |
| Number of subcarriers per tile | 4 | Number of all subcarriers used within tile |
| Tiles per subchannel | 6 | |

TABLE 4

| Parameter | Value | Notes |
| --- | --- | --- |
| Number of DC subcarriers | 1 | Index 64 |
| $N_{used}$ | 97 | Number of all subcarriers used within a symbol |
| Guard subcarriers: Left, Right | 16, 15 | |
| PermutationBase0 | 2, 0, 3, 1 | Used to allocate tiles to subchannels |
| $N_{subchannels}$ | 4 | |
| $N_{tiles}$ | 24 | |
| Number of subcarriers per tile | 4 | Number of all subcarriers used within tile |
| Tiles per subchannel | 6 | |

For 2048-point FFT, if permutation is exemplarily applied to tiles used for a subchannel of s=3 in accordance with the Math Figure 1 by using UL_PermBase=2, permutation parameters in Table 1 can be used. It is noted from Table 1 that the number of subchannels is $N_{subchannels}$=70, the number of subcarriers within each OFDMA symbol is (number of subcarriers per tile)×(tiles per subchannel)=4×6=24, the number of data subcarriers within each slot is Nsubcarriers=48, and the tile permutation pattern is represented by TilePermutation={6, 48, 58, 57, 50, 1, 13, 26, 46, 44, 30, 3, 27, 53, 22, 18, 61, 7, 55, 36, 45, 37, 52, 15, 40, 2, 20, 4, 34, 31, 10, 5, 41, 9, 69, 63, 21, 11, 12, 19, 68, 56, 43, 23, 25, 39, 66, 42, 16, 47, 51, 8, 62, 14, 33, 24, 32, 17, 54, 29, 67, 49, 65, 35, 38, 59, 64, 28, 60, 0}.

Referring to the Math Figure 1, basic pattern of 70 numbers is {6, 48, 58, 57, 50, 1, 13, 26, 46, 44, 30, 3, 27, 53, 22, 18, 61, 7, 55, 36, 45, 37, 52, 15, 40, 2, 20, 4, 34, 31, 10, 5, 41, 9, 69, 63, 21, 11, 12, 19, 68, 56, 43, 23, 25, 39, 66, 42, 16, 47, 51, 8, 62, 14, 33, 24, 32, 17, 54, 29, 67, 49, 65, 35, 38, 59, 64, 28, 60, 0}. If permutation for selection of subchannel(s) is performed and rotation is performed three times in accordance with s=3, a new pattern of {57, 50, 1, 13, 26, 46, 44, 30, 3, 27, 53, 22, 18, 61, 7, 55, 36, 45, 37, 52, 15, 40, 2, 20, 4, 34, 31, 10, 5, 41, 9, 69, 63, 21, 11, 12, 19, 68, 56, 43, 23, 25, 39, 66, 42, 16, 47, 51, 8, 62, 14, 33, 24, 32, 17, 54, 29, 67, 49, 65, 35, 38, 59, 64, 28, 60, 0, 6, 48, 58} is obtained. If UL_PermBase is added to six numbers {57, 50, 1, 13, 26, 46} of the new pattern, {59, 52, 3, 15, 28, 48} is obtained. If a value obtained by addition of UL_PermBase is more than 70, modulo operation is performed. Finally, if $N_{subchannel}$×n=70×n is added to {59, 52, 3, 15, 28, 48}, {70×0+59, 70×1+52, 70×2+3, 70×3+15, 70×4+ 28, 70×5+48}={59, 122, 143, 255, 308, 398} can be obtained. In other words, logical tiles {0, 1, 2, 3, 4, 5, 6} within the subchannel of s=3 are mapped into physical tiles {59, 122, 143, 255, 308, 398}.

In the mean time, referring to FIG. 9(b), in the uplink of the IEEE 802.16m, each DRU of one frequency partition is divided into three tiles of six neighboring subcarriers over $N_{sym}$ number of symbols. Permutation is applied to the tiles within one frequency partition to obtain frequency diversity over the allocated resources. Tile permutation for allocating physical tiles of DRUs to logical tiles of subchannels can be performed by using the following Math Figure 2, for example.

MathFigure 2

$$\text{Tiles}(s,n,t) = L_{DRU,FPi} \cdot n + g(\text{PermSeq}(\ ),s,n,t) \quad [\text{Math.2}]$$

In the Math Figure 2, g(PermSeq( ),s,n,t) can be defined as follows.

MathFigure 3

$$g(\text{PermSeq}(\ ),s,n,t) = \{\text{PermSeq}[(n+107*s+1213*t) \bmod L_{DRU,FPi}] + \text{UL\_PermBase}\} \bmod L_{DRU,FPi} \quad [\text{Math.3}]$$

In the Math Figure 2 and the Math Figure 3, Tiles(s,n,t) represents a physical tile index of the n-th the located at the s-th distributed LRU (DLRU) of the t-th subframe. n is a tile index within one distribution LRU and has one integer value between 0 and 2, t represents a subframe index at a corresponding frame, and s is a distributed LRU index and has one of values between 0 and $L_{DRU,FPi}-1$. $L_{DRU,FPi}$ represents the number of DRUs included in the frequency partition i, and PermSeq( ) represents a permutation sequence of a length $L_{DRU,FPi}$. PermSeq( ) can be determined by SEED={IDcell*343} mod 210. The permutation sequence can be generated by a random sequence generation algorithm. For example, a random sequence generation algorithm having 10-bit SEED(Sn-10, Sn-9, ..., Sn-1) generates a permutation sequence of size M.

The user equipment according to the present invention can set UL_PermBase in the Math Figure 3 as a value of cell ID (IDcell). The improved user equipment implemented in accordance with the IEEE 802.16m can perform tile permutation by using the Math Figure 2 and the Math Figure 3. At this time, the improved user equipment can perform tile permutation by setting UL_PermBase in the Math Figure 3 as cell ID obtained from the SA-preamble.

Figure 10:
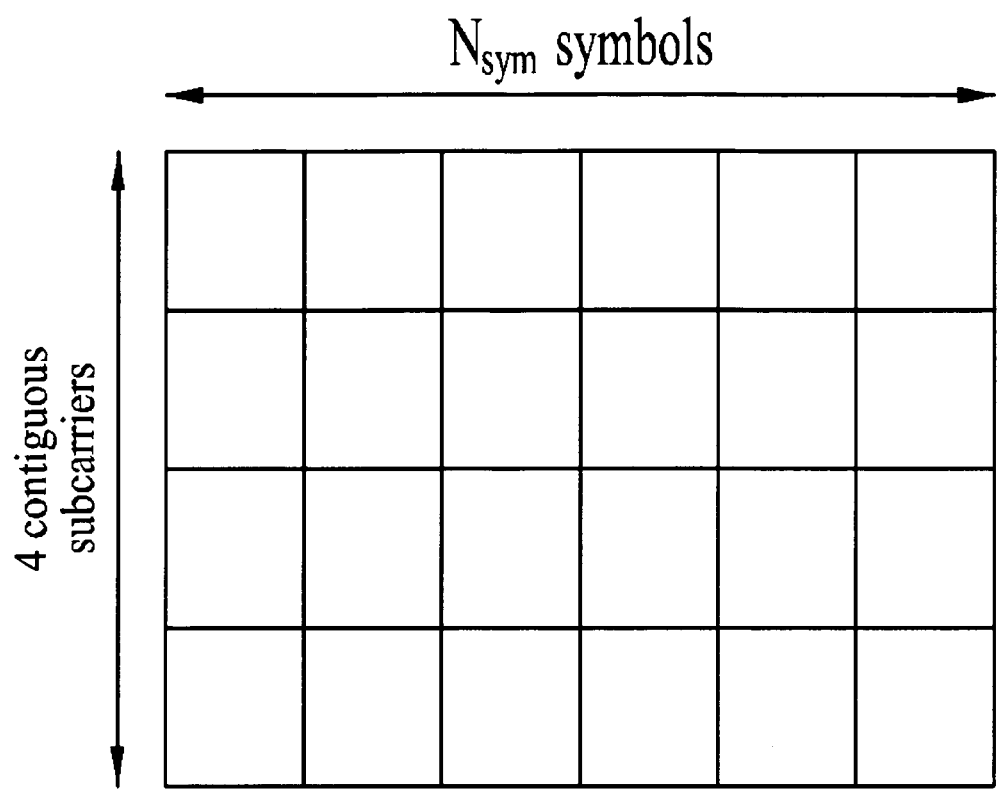
FIG. 10 illustrates a basic tile structure based on the IEEE 802.16m system for uplink permutation in an FDM based legacy system support mode.

FIG. 10 illustrates a basic tile structure based on the IEEE 802.16m system for uplink permutation in an FDM based legacy system support mode.

As described with reference to FIG. 4(a), subcarriers can be divided by the legacy user equipment and the improved user equipment for the predetermined time interval and then can be used for uplink transmission. In other words, uplink data based on the IEEE 802.16e and uplink data based on the IEEE 802.16m are multiplexed for the predetermined time interval in accordance with the FDM manner and then transmitted to the base station. Hereinafter, a resource zone used for uplink transmission in the FDM based legacy system support mode will be referred to as an FDM based UL PUSC (Partial Usage of SubChannel) zone. The PUSC means a subcarrier management manner that partially uses subchannels within a whole system bandwidth without using all the subchannels at one time.

At this time, the legacy user equipment implemented in accordance with the IEEE 802.16e transmits uplink data by performing permutation for the uplink tile in accordance with the Math Figure 1. However, the improved user equipment implemented in accordance with the IEEE 802.16m should not perform uplink tile permutation in accordance with the Math Figure 2 and the Math Figure 3 for the corresponding time interval. This is because that, as illustrated in FIG. 9, the size of the tile and frequency size defined in the IEEE 802.16m is different from those defined in the IEEE 802.16e, and the tile permutation rule of the IEEE 802.16m, which is defined in accordance with the Math Figure 2 and the Math Figure 3 is also different from that of the IEEE 802.16e, which is defined in accordance with the Math Figure 1. If the improved user equipment performs the tile permutation in accordance with the Math Figure 2 and the Math Figure 3 even in the FDM based legacy system mode, the one-to-one correspondence relation between the physical tiles and the logical tiles may not be formed. Accordingly, in order to prevent the resources of the legacy user equipment from colliding with the resources of the improved user equipment, the improved user equipment operated in the FDM based legacy system support mode performs tile permutation in accordance with the Math Figure 1 in the same manner as the legacy user equipment.

Referring to FIG. 10, the improved user equipment operated in the FDM based legacy system support mode performs permutation in accordance with a tile structure that includes four neighboring subcarriers over $N_{sym}$ number of symbols. At this time, $N_{sym}$ becomes 6 or 9 corresponding to a multiple of three symbols constituting the tile of the IEEE 802.16e. I order to support the FDM based UL PUSC zone, subcarriers of one OFDMA symbol are partitioned by $N_{g,left}$ number of left guard subcarriers, $N_{g,right}$ number of right guard subcarriers, and $N_{used}$ number of used subcarriers.

Figure 11:
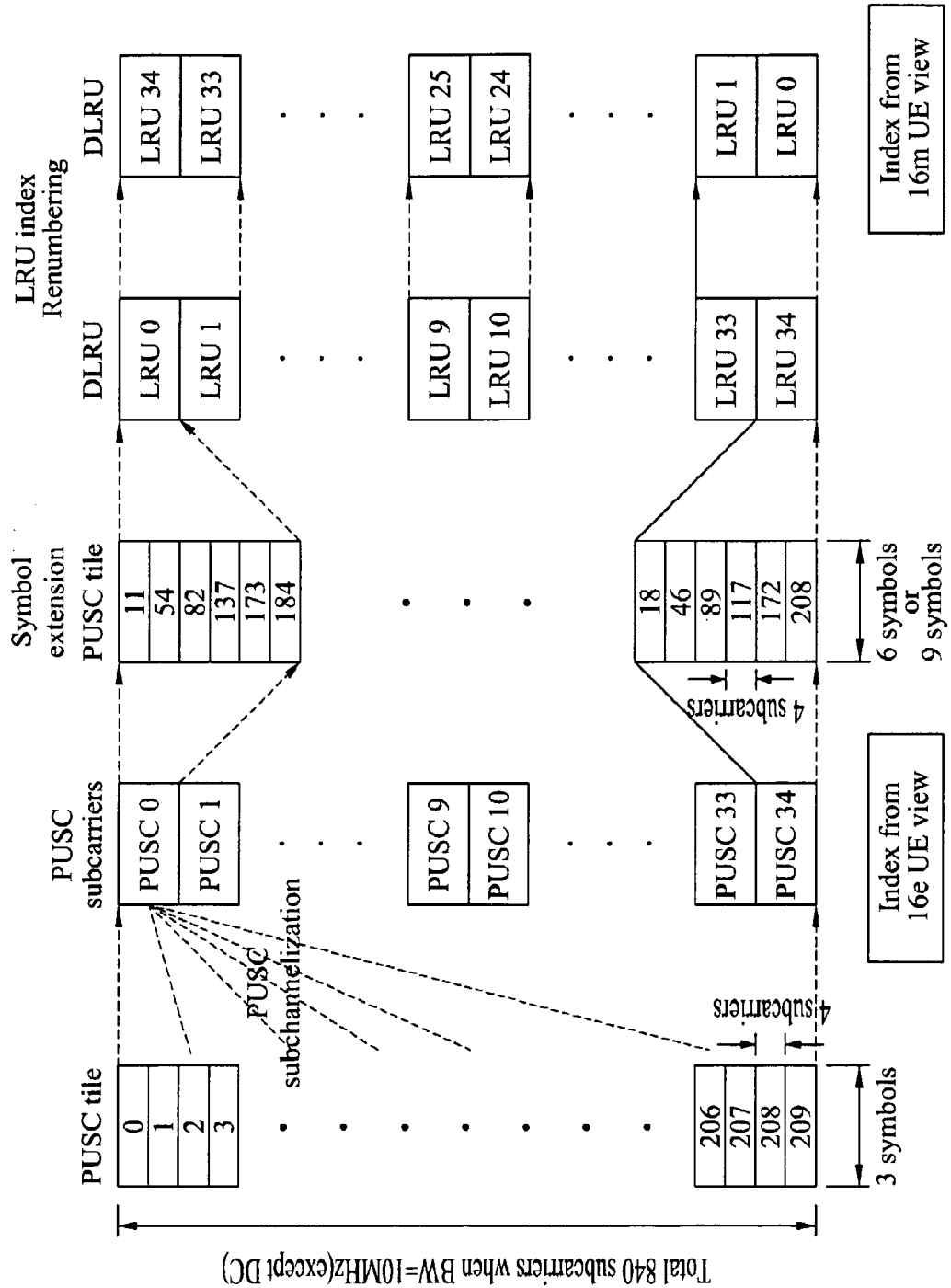
FIG. 11 illustrates a brief mapping process of mapping subcarriers into subchannels.

FIG. 11 illustrates a brief mapping process of mapping subcarriers into subchannels.

The $N_{used}$ number of subcarriers are partitioned by a plurality of PUSC tiles. The PUSC tiles are subjected to permutation by the Math Figure 1. All PUSC tiles of the subchannels, which are subjected to permutation, are extended from three OFDMA symbols to $N_{sym}$ OFDMA symbols in the time domain, wherein $N_{sym}$ depends on the type of the subframe. For example, if uplink transmission is performed through the type-1 subframe, $N_{sym}=6$ is obtained, and if uplink transmission is performed through the type-4 subframe, $N_{sym}=9$ is obtained. The DRU for the IEEE 802.16m is made based on the tiles subjected to symbol extension. If numbering is performed for the distributed LRU indexes in the reverse order of PUSC subchannel indexes, the mapping process of subcarriers into subchannels is completed.

If the improved user equipment operated in the FDM based legacy system support mode performs tile permutation in accordance with the Math Figure 1, a problem occurs in the value of UL_PermBase. Although the legacy user equipment performs tile permutation by using the UL_PermBase received from the base station, in order that the improved user equipment performs tile permutation together with the legacy user equipment, the improved user equipment should use the same UL_PermBase as that used by the legacy user equipment in the Math Figure 1. If the value of UL_PermBase used by the legacy user equipment is a value optionally selected from the base station, the improved user equipment should receive the same UL_PermBase from the base station.

Embodiment 1 of UL_PermBase

The base station operated in accordance with the FDM based legacy system support mode transmits the value of UL_PermBase to the legacy user equipment through the UCD and transmits the same value of UL_PermBase to the improved user equipment through the SFH or the MAC control message, for example, AAI_SCD (Advanced Air Interface System Configuration Descriptor) message. The base station can transmit cell ID to the legacy user equipment and the improved user equipment, respectively, as the value of UL_PermBase.

The improved user equipment can perform tile permutation in accordance with the Math Figure 1 by using the UL_PermBase transmitted through the SFH or the MAC control message. Alternatively, the improved user equipment may perform tile permutation by acquiring cell ID from the SA-preamble and setting the cell ID to the UL_PermBase of the Math Figure 1.

Embodiment 2 of UL_PermBase

The base station operated in accordance with the FDM based legacy system support mode transmits cell ID to the legacy user equipment as the value of UL_PermBase but may not transmit the cell ID to the improved user equipment. Since the improved user equipment can acquire cell ID from the SA-preamble, the value of UL_PermBase indicating the cell ID may not be provided to the improved user equipment explicitly. In the IEEE 802.16e, since UL_PermBase is transmitted at 7 bits, if UL_PermBase is explicitly transmitted to the improved user equipment, overhead of 7 bits occurs. Accordingly, according to the embodiment 2 of UL_PermBase, it is advantageous in that downlink overhead equivalent to 7 bits can be reduced.

IDcell Configuration

The IEEE 802.16e defines a total of 114 cell IDs between 0 and 113, and the IEEE 802.16m defines a total of 768 cell IDs between 0 and 767. If the improved base station operated in accordance with the FDD based legacy system support mode transmits cell ID to the legacy user equipment as UL_PermBase, it is preferable that 768 cell IDs of the IEEE 802.16m which is the improved system are configured appropriately.

At present, in the IEEE 802.16m system, several types of base stations use cell IDs. For example, among cell IDs between 0 and 767, 258 cell IDs correspond to a macro cell, and the other 510 cell IDs are allocated to other type cells such as hotzone, relay, and femto cell. However, this considers only that 768 cell IDs are dedicated for the IEEE 802.16m system and does not define that some of the 768 cell IDs are transmitted to the user equipment implemented based on the IEEE 802.16e system. How cell IDs are assigned to the IEEE 802.16m system and the IEEE 802.16e system may remain as an implementation-dependent issue. For example, the base station that supports the FDM or TDM based legacy system may appropriately distribute the 768 cell IDs to the IEEE 802.16e system and the IEEE 802.16m system. Alternatively, some of the 768 cell IDs may be defined for the IEEE 802.16e system, another of the 768 cell IDs may be defined for the IEEE 802.16m system, and the other of the 768 cell IDs may be defined for both the IEEE 802.16e system and the IEEE 802.16m system. For another example, since the hotzone, the relay and the femto cell are newly defined in the IEEE 802.16m, cell IDs between 258 and 768 allocated to them may be regarded as the cell IDs dedicated for the IEEE 802.16m system. Since the IEEE 802.16e system is mainly configured by the macro base station, some of the cell IDs between 0 and 257 may be assigned to the IEEE 802.16e system and the other cell IDs may be assigned to the IEEE 802.16m system. The cell JDs assigned to the IEEE 802.16m system can be used as the value of UL_PermBase for both the legacy user equipment and the improved user equipment. For example, the cell IDs between 0 and 113 can be used as those of the IEEE 802.16e system. The cell IDs between 114 and 257 can be transmitted to the legacy user equipment and the improved user equipment in accordance with the legacy system support mode as the value of UL_PermBase (Embodiment 1 of UL_PermBase). Alternatively, the cell IDs between 114 and 257 may be transmitted to the legacy user equipment as the value of UL_PermBase in accordance with the legacy system support mode and may implicitly be signaled to the improved user equipment by the SA-preamble (Embodiment 2 of UL_PermBase).

Communication between the legacy BS and the legacy UE is not affected by the present invention. In other words, the legacy BS may select a random UL_PermBase like the existing manner and transmits the same to the user equipment(s) within its coverage. The legacy UE performs tile permutation by using UL_PermBase received from the legacy BS as UL_PermBase of the Math Figure 1, and transmits the tile permutated uplink signal to the legacy BS. Since the legacy BS knows the value of UL_PermBase used by the legacy UE, it can know subcarriers on which the uplink signal is transmitted. Accordingly, the legacy BS can effectively receive the uplink signal or can effectively detect the uplink signal from the received signals.

The aforementioned invention can be applied to communication between the BS operated in the legacy system support mode and the legacy UE or the improved UE. The present invention will now be described in view of the IEEE 802.16m BS (hereinafter, 16m BS), the IEEE 802.16e UE (hereinafter, 16e UE) and the IEEE 802.16m UE (16m UE).

Communication Between 16m BS and 16e UE

The 16e UE recognizes the 16m BS operated in the legacy system support mode as the 16e BS. The 16m BS performs downlink transmission by configuring some of superframes/frames/subframes in accordance with the IEEE 802.16e, whereby the 16e UE recognizes the 16m BS as the 16e BS. The 16m BS transmits UL_PermBase to the 16e UE through the UCD, so that the 16e UE performs tile permutation, and transmits its cell ID to the 16e UE as the UL_PermBase. The 16e UE performs tile permutation of the uplink signal by applying the UL_PermBase transmitted from the 16m BS to the Math Figure 1. The 16e UE transmits the tile permutated uplink signal to the 16m BS. Since the 16m BS knows that the UL_PermBase used by the 16e UE is the cell ID of the 16m BS, it can identify subcarriers constituting the permutated tiles by using the cell ID. Accordingly, the 16m BS can detect the uplink signal from the subcarriers.

The process 400b of the 16m BS operated in accordance with the FDM or TDM legacy system support mode generates the UCD having cell ID of the 16m BS as UL_PermBase. The 16m BS processor 400b controls the transmitter 100b of the 16m BS to transmit the UCD to the 16e UE(s) within the corresponding coverage. The receiver 300a of the 16e UE receives the UCD and transmits the same to the processor 400a of the 16e UE. The 16e UE processor 500a sets the UL_PermBase of the Math FIG. 1 to the value of UL_PermBase transmitted from the 16m BS, and performs tile permutation in accordance with the Math Figure 1. The subcarrier mappers 140-1 to 140-K of the 16e UE transmitter 100a maps uplink data into subcarriers under the control of the 16e UE processor 400a in accordance with the mapping relation between the physical tiles and the logical tiles based on the tile permutation. The 16e UE transmitter 100a transmits the uplink data through the corresponding subcarriers to the 16m BS.

The 16m BS processor 400b can identify the subcarriers on which the uplink data of the 16e UE are transmitted, based on the cell ID. The 16m BS processor 400b controls the 16m BS receiver 300b to detect the uplink data from the subcarriers based on the cell ID.

Communication Between 16m BS and 16m UE

The 16m UE according to the present invention is connected to the 16m BS in accordance with the legacy system support mode or the legacy system non-support mode. The 16m BS can transmit information indicating whether it is operated in accordance with the legacy system support mode to the 16m UE. The processor 400b of the 16m BS generates information indicating the operation mode of the 16m BS, and transmits the information to the UEs within the corresponding coverage by controlling the transmitter 100b of the 16m BS. For example, the 16m BS transmits frame configuration information to the 16m UE through the SFH, wherein predetermined ones of indexes transmitted as the frame configuration information are defined as the frame configuration information in the legacy system support mode. Also, the predetermined indexes may be divided into the frame configuration information of the FDM based legacy system support mode and the frame configuration information of the TDM based legacy system support mode. The 16m UE can recognize a mode with which it is connected to the 16m BS, based on the frame configuration information transmitted through the SFH.

If the 16m BS is operated in accordance with the FDM based legacy system support mode (S710, S730), it transmits the SA-preamble corresponding to its cell ID to the 16e UE and also transmits the cell ID to the 16m UE as UL_PermBase. The 16m BS can transmit the UL_PermBase to the 16m UE through the SFH or MAC control message (Embodiment 1 of UL_PermBase). Alternatively, the 16m BS transmits the SA-preamble but may not transmit the UL_PermBase separately (Embodiment 2 of UL_PermBase). In other words, the processor 400b of the 16m BS can control the transmitter 100b of the 16m BS to transmit the SA-preamble corresponding to the cell ID. Also, the processor 400b of the 16m BS can control the transmitter 100b of the 16m BS to generate the SFH or MAC control message having the cell ID as UL_PermBase and transmit the generated SFH or MAC control message to the UE(s).

The 16m UE receives the UL_PermBase, and performs tile permutation in accordance with the Math Figure 1 by using the UL_PermBase (S730). Alternatively, the 16m UE receives the SA-preamble, and performs tile permutation in accordance with the Math Figure 1 by using the cell ID corresponding to the SA-preamble as the UL_PermBase (S730). The processor 400a of the 16m UE performs tile permutation by using UL_PermBase directly received from the 16m BS or cell ID acquired from the SA-preamble. In any case, since cell ID of the 16m BS is used as UL_PermBase of the Math Figure 1, the same tile permutation result will be obtained. The 16m UE transmits the tile permutated uplink signal to the 16m BS (S750). The subcarrier mappers 140-1 to 140-K of the 16m UE transmitter 100a maps uplink data to subcarriers under the control of the 16m UE processor 400a in accordance with the mapping relation between the physical tiles and the logical tiles based on the tile permutation of the Math Figure 1. The 16m UE transmitter 100a transmits the uplink data through the corresponding subcarriers to the 16m BS.

Since the 16m BS knows that the cell ID has been used as UL_PermBase of the Math FIG. 1, it can receive the uplink signal transmitted from the 16m UE based on the cell ID and the Math Figure 1. The 16m BS processor 400b can identify the subcarriers on which the uplink data of the 16m UE are transmitted, based on the cell ID. The 16m BS processor 400b controls the 16m BS receiver 300b to detect the uplink data on the subcarriers based on the cell ID and the Math Figure 1.

If the 16m BS is operated in accordance with the TDM based legacy system mode or the legacy system non-support mode (S710~S720), the 16m BS does not transmit UL_PermBase separately. However, the 16m BS transmits the SA-preamble corresponding to the cell ID of the 16m BS. The 16m UE connected to the 16m BS in accordance with the TDM based legacy system support mode or the legacy system non-support mode acquires the cell ID by receiving the SA-preamble and performs tile permutation in accordance with the Math Figure 2 by substituting the cell ID for UL_PermBase of the Math Figure 2 (S740). The 16m UE transmits the uplink signal permutated in accordance with the Math Figure 2 to the 16m BS (S750). The processor 400a of the 16m UE acquires the cell ID from the SA-preamble and performs tile permutation in accordance with the Math Figure 2 by using the cell ID as UL_PermBase.

The subcarrier mappers 140-1 to 140-K of the 16m UE transmitter 100a maps uplink data to subcarriers under the control of the 16m UE processor 400a in accordance with the mapping relation between the physical tiles and the logical tiles based on the tile permutation of the Math Figure 2. The 16m UE transmitter 100a transmits the uplink data on the corresponding subcarriers to the 16m BS.

The 16m BS knows that the 16m UE has performed tile permutation in accordance with the Math Figure 2 by using the cell ID as UL_PermBase. Accordingly, the 16m BS can receive the uplink signal transmitted from the 16m UE based on the cell ID and the Math Figure 2. The 16m BS processor 400b can identify the subcarriers on which the uplink data of the 16m UE are transmitted, based on the cell ID. The 16m BS processor 400b controls the 16m BS receiver 300b to detect the uplink data on the subcarriers based on the cell ID and the Math Figure 2.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to a base station, a mobile station, or other communication devices in a wireless communication system.

The invention claimed is:

1. A method for transmitting a signal from a user equipment in a wireless communication system that supports a legacy system and an enhanced system improved from the legacy system by adding one or more functions to the legacy system, the method comprising:
if the user equipment is an enhanced user equipment based on the enhanced system, performing permutation for an uplink (UL) signal on a frequency axis in accordance with a first rule when the enhanced user equipment is connected to a base station with a legacy system support mode, and performing permutation for the UL signal on the frequency axis in accordance with a second rule when the enhanced user equipment is connected to the base station with a legacy system non-support mode; and
transmitting the UL signal to the base station,
wherein the enhanced user equipment performs permutation for the UL signal by using the first rule or the second rule based on a cell identity (ID) corresponding to a secondary advanced (SA) preamble received from the base station, wherein the first rule is defined in accordance with Tiles(s, n), where Tiles(s,n)=$N_{subchannels}$×n+(Pt[(s+n) mod $N_{subchannels}$]+UL_PermBase) mod $N_{subchannels}$, Tiles(s, n) representing a physical tile index for the n-th tile located at the s-th subchannel, $N_{subchannels}$ representing the number of subchannels, and Pt representing a tile permutation pattern, wherein the second rule is defined in accordance with Tiles(s,n,t), where Tiles(s,n,t)=$L_{DRU,FPi}$×n+{PermSeq[(n+107*s+1213*t) mod $L_{DRU,FPi}$]+UL_PermBase} mod $L_{DRU,FPi}$, Tiles(s,n,t) represents a physical tile index of the n-th tile located at the s-th distributed logical resource unit (DLRU) of the t-th subframe, $L_{DRU,FPi}$ represents the number of distributed resource units (DRUs) included in frequency partition (FP) i, and PermSeq( ) represents a permutation sequence of a length $L_{DRU,FPi}$, and wherein the enhanced user equipment performs permutation for the UL signal by setting UL_PermBase to the cell ID.

2. The method as claimed in claim 1, wherein if the user equipment is a legacy user equipment based on the legacy system, the legacy user equipment receives UL_PermBase from the base station, and performs permutation for the UL signal by setting the UL_PermBase used to determine Tiles(s,n) to the received UL_PermBase.

3. A user equipment for transmitting a signal in a wireless communication system that supports a legacy system and an enhanced system improved from the legacy system by adding one or more functions to the legacy system, the user equipment comprising:

if the user equipment is an enhanced user equipment based on the enhanced system, a receiver configured to receive a secondary advanced (SA) preamble from a base station;

a transmitter configured to transmit an uplink (UL) signal to the base station; and a processor configured to perform permutation for the UL uplink signal on a frequency axis in accordance with a first rule when the enhanced user equipment is connected to the base station with a legacy system support mode, and perform permutation for the UL signal on the frequency axis in accordance with a second rule when the enhanced user equipment is connected to the base station with a legacy system non-support mode;

wherein the processor is configured to perform permutation for the UL signal by using the first rule or the second rule based on a cell identity (ID) corresponding to the SA-preamble, wherein the first rule is defined in accordance with Tiles(s, n), where Tiles(s,n)=$N_{subchannels}$×n+(Pt[(s+n) mod $N_{subchannels}$]+UL_PermBase) mod $N_{subchannels}$, Tiles (s,n) represents a physical tile index for the n-th tile located at the s-th subchannel, $N_{subchannels}$ represents the number of subchannels, and $P_t$ represents a tile permutation pattern, and wherein the second rule is defined in accordance with Tiles(s, n, t), where Tiles(s,n,t)=$L_{DRU,Fpi}$×n+{PermSeq[(n+107*s+12131) mod $L_{DRU,Fpi}$]+UL_PermBase} mod $L_{DRU,Fpi}$, Tiles(s,n,t) represents a physical tile index of the n-th tile located at the s-th distributed logical resource unit (DLRU) of the t-th subframe, $L_{DRU,Fpi}$ represents the number of distributed resource units (DRUs) included in frequency partition (FP) i, and PermSeq( ) represents a permutation sequence of a length $L_{DRU,Fpi}$, and wherein the processor performs permutation for the UL signal by setting the UL_PermBase to cell ID.

4. The user equipment as claimed in claim 3, wherein if the user equipment is a legacy user equipment based on the legacy system, the receiver is further configured to receive UL_PermBase from the base station, and the processor performs permutation for the UL signal by setting the UL_PermBase used to determine Tiles(s,n) to the received UL_PermBase.

5. A method for receiving a signal from a user equipment to a base station in a wireless communication system that supports a legacy system and an enhanced system improved from the legacy system by adding one or more functions to the legacy system, the method comprising:

if the base station is operated in a legacy system support mode, transmitting a cell identity (ID) of the base station to a legacy user equipment as uplink permbase (UL_PermBase), and transmitting a secondary advanced (SA) preamble corresponding to the cell ID to an enhanced user equipment; and respectively receiving a UL signal of the legacy user equipment and a UL signal of the enhanced user equipment from the legacy user equipment and the enhanced user equipment, the UL signals being permutated on a frequency axis in accordance with a first rule based on the cell ID, if the base station is operated in accordance with a legacy system non-support mode, transmitting the SA-preamble corresponding to the cell ID to the enhanced user equipment; and receiving a UL signal of the enhanced user equipment from the enhanced user equipment, the UL signal being permutated on a frequency axis in accordance with a second rule based on the cell ID, wherein the first rule is defined in accordance with Tiles(s, n), where Tiles(s,n)=$N_{subchannels}$×n+(Pt[(s+n) mod $N_{subchannels}$]+UL_PermBase) mod $N_{subchannels}$, Tiles(s, n) represents a physical tile index for the n-th tile located at the s-th subchannel, $N_{subchannels}$ represents the number of subchannels, and Pt represents a tile permutation pattern, wherein the second rule is defined in accordance with Tiles(s,n,t), where Tiles(s,n,t)=$L_{DRU,FPi}$×n+{PermSeq[n+107*s+1213*t) mod $L_{DRU,FPi}$]+UL_PermBase} mod $L_{DRU,FPi}$, Tiles(s,n,t) represents a physical tile index of the n-th tile located at the s-th distributed logical resource unit (DLRU) of the t-th subframe, $L_{DRU,FPi}$ represents the number of distributed resource units (DRUs) included in frequency partition (FP) i, and PermSeq( ) represents a permutation sequence of a length $L_{DRU,FPi}$, and wherein the UL signal of the enhanced user equipment is permutated by setting UL_PermBase to the cell ID.

6. A base station for receiving a signal from a user equipment in a wireless communication system that supports a legacy system and an enhanced system improved from the legacy system by adding one or more functions to the legacy system, the base station comprising:

a transmitter configured to transmit a signal;

a receiver configured to receive a signal; and a processor connected to the transmitter and the receiver and configured to control transmitter and the receiver, wherein if the base station is operated in accordance with a legacy system support mode:

the processor is further configured to control the transmitter to transmit a cell identity (ID) of the base station to a legacy user equipment as uplink permbase (UL_PermBase), control the transmitter to transmit a secondary advanced (SA) preamble corresponding to the cell ID to an enhanced user equipment, and control the receiver to respectively receive a UL signal of the legacy user equipment and a UL signal of the enhanced user equipment from the legacy user equipment and the enhanced user equipment, the UL signals being permutated on a frequency axis in accordance with a first rule based on the cell ID; and if the base station is operated in accordance with a legacy system non-support mode:

the processor is configured to control the transmitter to transmit the SA-preamble corresponding to the cell ID to the enhanced user equipment, and control the receiver to receive a UL signal of the enhanced user equipment from the enhanced user equipment, the UL signal being permutated on a frequency axis in accordance with a second rule based on the cell ID, wherein the first rule is defined in accordance with Tiles(s, n), where $Tiles(s,n) = N_{subchannels} \times n + (Pt[(s+n) \mod N_{subchannels}] + UL\_PermBase) \mod N_{subchannels}$, Tiles(s, n) represents a physical tile index for the n-th tile located at the s-th subchannel, $N_{subchannels}$ represents the number of subchannels, and Pt represents a tile permutation pattern, wherein the second rule is defined in accordance with Tiles(s,n,t), where $Tiles(s,n,t) = L_{DRU,FPi} \times n + (PermSeq[(n+107*s+1213*t) \mod L_{DRU,FPi}] + UL\_PermBase) \mod L_{DRU,FPi}$, Tiles(s,n,t) represents a physical tile index of the n-th tile located at the s-th distributed logical resource unit (DLRU) of the t-th subframe, $L_{DRU,FPi}$ represents the number of distributed resource units (DRUs) included in frequency partition i, and PermSeq( ) represents a permutation sequence of a length $L_{DRU,FPi}$, and wherein the UL signal of the enhanced user equipment is permutated by setting UL_PermBase to the cell ID.

* * * * *